(12) United States Patent
Shirakawa

(10) Patent No.: US 8,742,980 B2
(45) Date of Patent: Jun. 3, 2014

(54) RADAR DEVICE AND TARGET DETECTION METHOD

(75) Inventor: Kazuo Shirakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 386 days.

(21) Appl. No.: 13/329,455

(22) Filed: Dec. 19, 2011

(65) Prior Publication Data

US 2012/0200446 A1 Aug. 9, 2012

(30) Foreign Application Priority Data

Feb. 7, 2011 (JP) .................................. 2011-024110

(51) Int. Cl.
*G01S 13/52* (2006.01)

(52) U.S. Cl.
USPC .......................................... 342/165; 342/189

(58) Field of Classification Search
CPC ............................... G01S 13/003; G01S 13/90
USPC .................................................. 342/165, 189
See application file for complete search history.

(56) References Cited

U.S. PATENT DOCUMENTS

| | | | |
|---|---|---|---|
| 4,417,249 A * | 11/1983 | Zscheile, Jr. .................. | 342/379 |
| 6,067,048 A | 5/2000 | Yamada | |
| 6,288,672 B1 | 9/2001 | Asano et al. | |
| 7,196,656 B2 | 3/2007 | Shirakawa | |
| 7,778,249 B2 | 8/2010 | Shirakawa | |
| 7,859,450 B2 | 12/2010 | Shirakawa et al. | |
| 2001/0215964 | 9/2011 | Shirakawa | |

FOREIGN PATENT DOCUMENTS

| | | |
|---|---|---|
| DE | 10 2009 027 003 | 12/2010 |
| EP | 2363727 | 9/2011 |
| JP | 11-231040 A | 8/1999 |
| JP | 2000-155171 A | 6/2000 |
| JP | 2006-098181 A | 4/2006 |
| JP | 2007-155381 A | 6/2007 |
| JP | 2011-185618 | 9/2011 |
| WO | WO 2010/145904 A1 | 12/2010 |

OTHER PUBLICATIONS

"Extended European Search Report" mailed by EPO and corresponding to European application No. 11194889.9 on May 23, 2012.
Kees et al., "Improvement of Angular Resolution of a Millimeterwave Imaging System by Transmitter Location Multiplexing," IEEE MTT-S Digest, pp. 969-972 (1995).

* cited by examiner

*Primary Examiner* — Timothy A Brainard
(74) *Attorney, Agent, or Firm* — Fujitsu Patent Center

(57) ABSTRACT

A radar device that detects a target includes two or more transmitting antennas and two or more receiving antennas, including a combination of two or more transmitting antennas and receiving antennas that form two or more reference paths at which spatial phases become identical; an envelope detection unit that acquires an envelope of a reception signal received by the receiving antenna in each of the reference paths; a determination unit that decides a phase correction amount between the reference paths from a delay amount that yields a minimum value of an integrated distance between envelopes of the reception signals of the reference paths; and a correction unit that aligns phases of all reception signals received by the two or more receiving antennas, using the decided phase correction amount.

6 Claims, 24 Drawing Sheets

RADAR DEVICE AND TARGET DETECTION METHOD

CROSS-REFERENCE TO RELATED APPLICATION

This application is based upon and claims the benefit of priority of the prior Japanese Patent Application No. 2011-024110, filed on Feb. 7, 2011, the entire contents of which are incorporated herein by reference.

FIELD

The invention relates to a detection and radar apparatus and a target detection method that utilize aperture synthesis.

BACKGROUND

In detection and ranging apparatuses, for instance in-vehicle radars (hereafter, a radar device is taken as a specific example of the detection and ranging apparatus), it is possible to reduce the size of the device, without sacrificing performance, by resorting to a technology wherein the aperture of a sensor array is enlarged through a combination of a transmission sensor array made up of a plurality of transmission sensor elements and a reception sensor array made up of a plurality of reception sensor elements. Such a technology is referred to, for instance, as holographic aperture synthesis, holograph or aperture synthesis. A radar device that utilizes aperture synthesis radiates probe signals from the plurality of transmission sensor elements (by time-division multiplexing, frequency division multiplexing, code division multiplexing or a combination thereof). The radar device receives then, at the plurality of reception sensor elements, echo signals generated through reflection of the probe signal in a target to be detected. The radar device synthesizes the signals received by the respective reception sensor elements to increase likewise the number of effective reception sensor elements, to increase the number of detectable targets, and to enhance angular resolution. Hereafter, a radar device that utilizes aperture synthesis will be referred to as synthetic aperture radar. Also, the sensor elements are used as antennas (elements), and the sensor array as an array antenna, without distinction.

[Patent document 1] Japanese Patent Application Publication No. 2000-155171
[Patent document 2] Japanese Patent Application Publication No. 2006-98181
[Patent document 3] Japanese Patent Application Publication No. 2007-155381
[Patent document 4] Japanese Patent Application Publication No. H11-231040

However, conventional synthetic aperture radars have a problem in that the target to be detected cannot be precisely detected under some specific conditions. Such conditions include, for instance, instances where a plurality of objects is present at virtually identical relative distances in the line of sight from the radar (hereinafter, referred to simply as "distances"), and instances where the objects move at substantially the same relative velocity (hereinafter, referred to simply as "velocity") in the line of sight. A detailed examination of such cases reveals that there is a possibility that a target may fail to be detected accurately, also in daily recurrent scenes such as a traffic jam (i.e. where a plurality of objects moves with small velocity differences at close positions). Synthetic aperture radars, as in-vehicle radars, suffer from such problems.

SUMMARY

The various aspects disclosed herein adopt the below-described respective configurations with a view to solving the above-described problems.

A first aspect is a radar device that detects a target comprises:

two or more transmitting antennas and two or more receiving antennas, including a combination of two or more transmitting antennas and receiving antennas that form two or more reference paths at which spatial phases become identical;

an envelope detection unit that acquires an envelope of a reception signal received by the receiving antenna in each of the reference paths;

a decision unit that decides a phase correction amount between the reference paths from a delay amount, that yields a minimum value of an integrated distance between envelopes of the reception signals of the reference paths, as acquired by the envelope detection unit; and a correction unit that aligns phases of all reception signals received by the two or more receiving antennas, using the phase correction amount decided by the decision unit.

Other aspects may be a target detection method that realizes any of the features above, a program that executes such a method, and a computer-readable storage medium in which such a program is stored.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF THE EMBODIMENT

A detection and ranging apparatus according to an embodiment of the invention is explained below. The features in the embodiments below are illustrative in nature, and the invention is not limited to the features of the embodiments.

Comparative Example

A comparative example will be explained first, prior to an explanation of the embodiments of the invention. The resolution of detection and ranging apparatuses having a target angle detection function by a sensor array is determined fundamentally by the physical aperture of the sensor. As a result, holographic aperture synthesis schemes (hereafter referred to simply as holographs, or aperture synthesis) wherein an effective aperture is expanded through a combination of a plurality of transmission sensors and a plurality of reception sensors, are used in, for instance, detection and ranging apparatus that are used in in-vehicle radars that are subjected to severe dimensional limitations.

In the explanation of the comparative example below a radar device wherein FMCW (Frequency Modulated Continuous Wave) is used as the modulation scheme is envisaged as a specific example of the detection and ranging apparatus (Accordingly, an antenna serves as a sensor).

Figure 1:
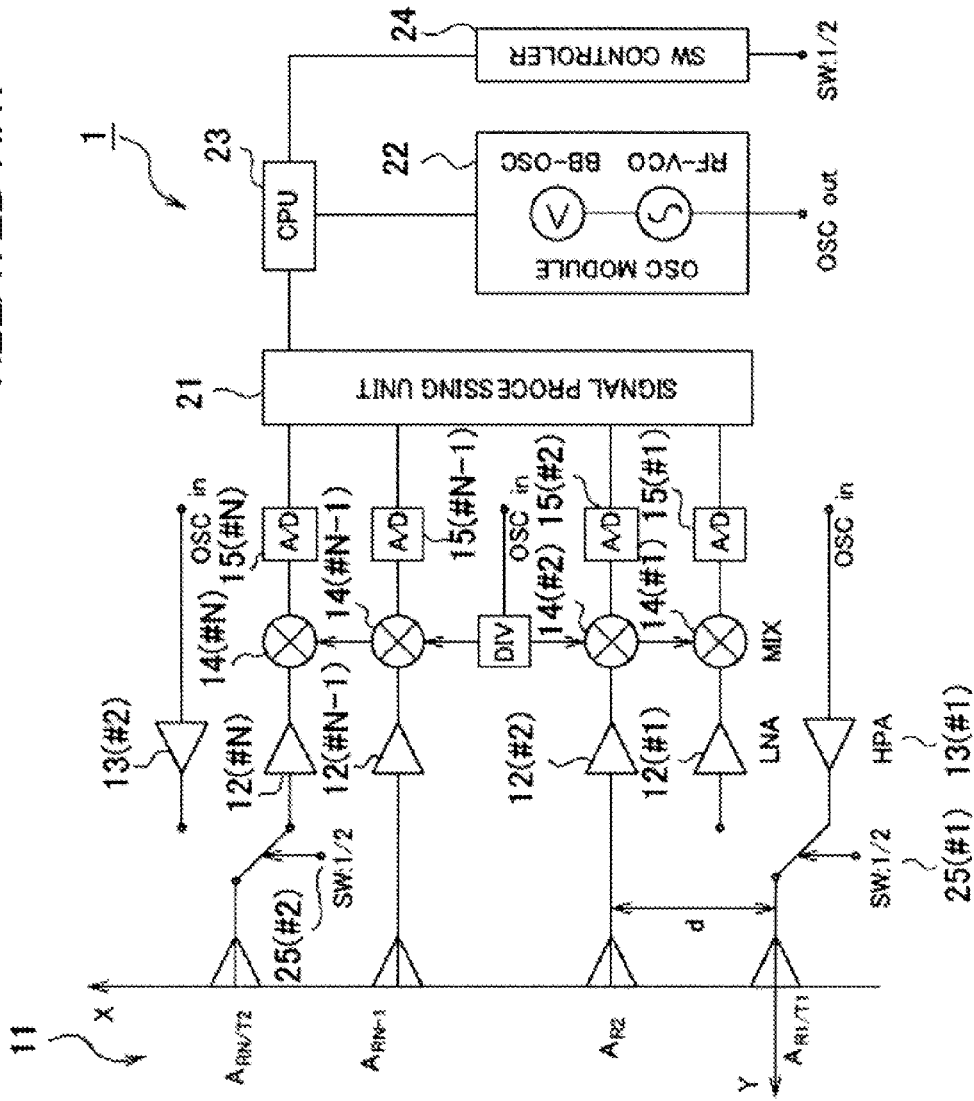
FIG. 1 is a diagram illustrating a configuration example of a radar device according to a comparative example.

FIG. 1 is a circuit block example of a detection and ranging apparatus (synthetic aperture radar device) according to a comparative example. In FIG. 1, shared antennas (transmitting and receiving antennas) $A_{R1/T1}$ and $A_{RN/T2}$ are disposed along the X axis in Cartesian coordinates. An array antenna (RX) for reception (receiving antenna) comprises N element antennas $A_{R1}$ to $A_{RN}$ disposed at a spacing d along the positive direction in the X axis, from the origin. An array antenna (transmitting antenna) for transmission (TX) comprises two (U=2) antennas $A_{T1}$ and $A_{T2}$ disposed at the outermost edges of the array antenna for reception.

The radar device 1 comprises an oscillator (OSC) module (oscillator module) 22. The OSC module 22 comprises a high-frequency voltage controlled oscillator (RF-VCO (Radio Frequency-Voltage Controlled Oscillator)) and a baseband oscillator (BB-OSC (Base Band Oscillator)). On the basis of a modulation input signal inputted by the BB-OSC, the RF-VCO outputs, as a system reference signal, a signal that is subjected to FM modulation (frequency modulation).

The system reference signal from the OSC module 22 is outputted, from the antennas $A_{T1}$ and $A_{T2}$, as a probe signal for target detection. The system reference signal is also used to demodulate an echo signal from the target received by the antennas $A_{R1}$ to $A_{RN}$.

Figure 2:
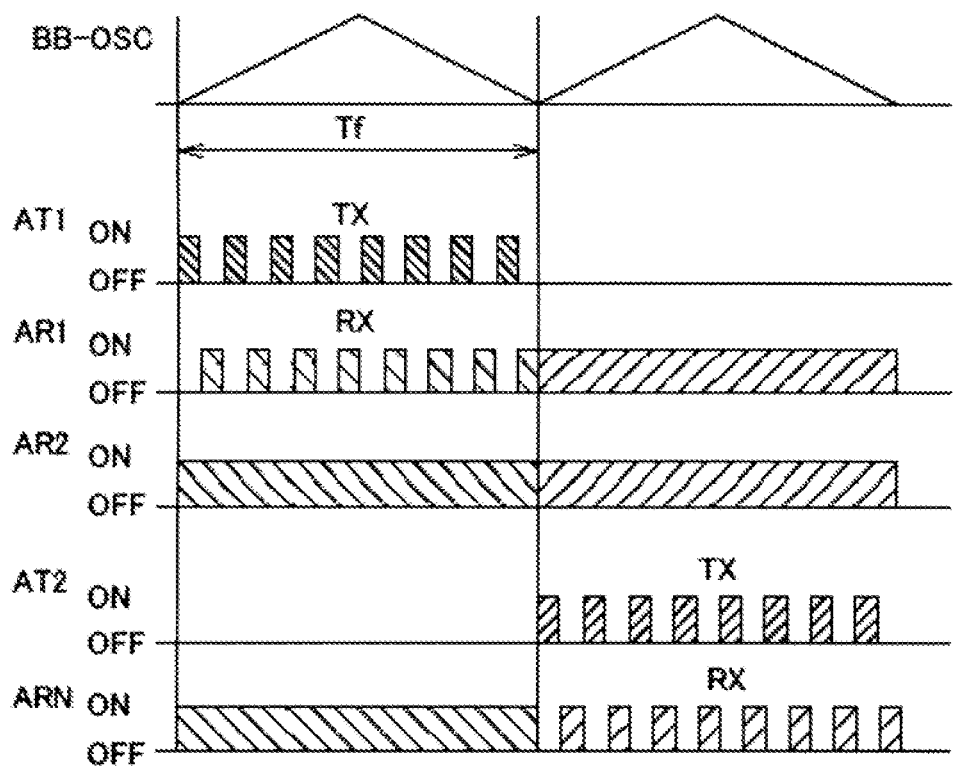
FIG. 2 is a timing chart used in the radar device of FIG. 1.

FIG. 2 is a timing chart of the detection and ranging apparatus 1 illustrated in FIG. 1. The radar device 1 utilizes two shared antennas $A_{R1/T1}$ and $A_{RN/T2}$ for transmission. Accordingly, at a measurement time $[0, T_f]$, a shared antenna $A_{R1/T1}$ is used as a transmission and reception (TX/RX) antenna, and receiving antennas $A_{R2}$ to $A_{RN-1}$ and the shared antenna $A_{RN/T2}$ are used as reception (RX) antennas. At a measurement time $[T_f, 2T_f]$, the shared antenna $A_{RN/T2}$ is used as a TX/RX antenna, and the shared antennas $A_{R1/T1}$ and the receiving antennas $A_{R2}$ to $A_{RN-1}$ are used as RX antennas. Herein, $T_f$ is the period of the modulation input signal.

Probe signals $v^{TX1}(t)$, $v^{TX2}(t)$ constitute the signals of period $T_f$, taking the probe signals at each time interval, i.e. the probe signals radiated by transmitting antennas $A_{T1}$ and $A_{T2}$, as $v^{TX1}(t)$ and $v^{TX2}(t)$. Therefore, $v^{TX1}(t)$ and $v^{TX2}(t)$ are represented by Expressions (1.1a) and (1.1b). Also, $\Delta\phi$ in $v^{TX2}(t)$ denotes phase shift on account of transmission time lag.

[Expression 1]

$$v^{TX1}(t) = \exp\{j[\omega_c t + h(t)]\} \qquad (1.1a)$$

$$v^{TX2}(t) = v^{TX1}(t+T_f) = \exp\{j[\omega_c t + h(t) + \Delta\phi]\} \qquad (1.1b)$$

In the equation, $\omega_c$ represents an RF-OSC carrier angular frequency (the explanation below does not distinguish between angular frequency and frequency); and $h(t)$ is defined by Expression (1.2) below with respect to a modulation input signal $f(x)$.

[Expression 2]

$$h(t) = \int_{-\infty}^{t} f(x)\,dx \qquad (1.2)$$

For simplicity, the time origin of the modulation input signal $f(x)$ is shifted by a half period, and is represented thereupon by Expression (1.3) below. In Expression (1.3), $\Delta\omega$ denotes one-sided modulation bandwidth.

[Expression 3]

$$f(x) = \begin{cases} \dfrac{4\Delta\omega}{T_f}x + \Delta\omega : -\dfrac{T_f}{2} \le x < 0 \\ -\dfrac{4\Delta\omega}{T_f}x + \Delta\omega : 0 \le x < \dfrac{T_f}{2} \end{cases} \quad (1.3)$$

Herein, it is assumed that M targets to be detected move continuously at a position of relative distance $r^m$(m) in the line-of-sight direction, at an angle $\theta^m$ (degrees) at a relative velocity $v^m$ (km/h) in the line of sight, with respect to the radar device 1 (the angle is assumed to be time-invariant). Herein, echo signals (reception signal) $v^{TX1}_{RX,n}(t)$ and $v^{TX2}_{RX,n}(t)$ received by the respective (n-th) RX antennas can be represented by Expressions (1.4a) and (1.4b) below, using the definitions of Expressions (1.5), (1.6a) and (1.6b) (n=1 to N, and m=1 to M). Needless to say, in the expressions, targets' velocities are treated in (m/s) unit.

The reception signals $v^{TX1}_{RX,n}(t)$ represent the respective signals resulting from reception, by the receiving antennas $A_{R1}$ to $A_{RN}$, of the echo signals from the probe signals radiated by the transmitting antenna $A_{T1}$ at a measurement time [0, $T_f$]. The reception signals $v^{TX2}_{RX,n}(t)$ represent the respective signals resulting from reception, by the receiving antennas $A_{R1}$ to $A_{RN}$, of the echo signals from probe signals radiated by transmitting antenna $A_{T2}$ at a measurement time [$T_f$, 2$T_f$]. Also, $n^{TX1/2}_n(t)$ is additive Gaussian noise. To avoid redundancy, the language "line-of-sight direction" will be omitted in the disclosure hereafter.

[Expression 4]

$$v^{TX1}_{RX,n}(t) = \sum_{m=1}^{M} \exp\{j[\omega_c(t - \tau^m(t)) + h(t - \tau^m(t)) + \phi_n^{TX1,m}]\} + n_n^{TX1}(t) \quad (1.4a)$$

$$v^{TX2}_{RX,n}(t) = \sum_{m=1}^{M} \exp\{j[\omega_c(t - \tau^m(t)) + h(t - \tau^m(t)) + \phi_n^{TX2,m}]\} + n_n^{TX2}(t) \quad (1.4b)$$

$$\tau^m(t) = \frac{2(r^m + v^m t)}{c} = \tau_0^m + \mu^m t, \; \mu^m = 2v^m/c \quad (1.5)$$

$$\phi_n^{TX1,m} = -\frac{2\pi}{\lambda}(n-1)d\sin(\theta^m) \quad (1.6a)$$

$$\phi_n^{TX2,m} = -\frac{2\pi}{\lambda}(N+n-2)d\sin(\theta^m) \quad (1.6b)$$

The echo signals (reception signals) are amplified by low-noise amplifiers (hereafter, LNAs) 12 (12#1 to #N), and are mixed, by mixers 14 (14#1 to #N), with a system reference signal from the OSC module 22, to be converted to baseband signals. By the context, baseband signals, demodulated signals or echo signals are used in the almost same sense.

The baseband signals are subjected to appropriate interface (IF) processing, such as amplification and filtering, and, thereafter, are converted into digital signals by analog/digital converters (A/D) 15 (15#1 to #N), for instance at a sampling frequency $\omega_s=\omega_f*K$ ($\omega_f=2\pi/T_f$, K being the number of samplings). Then, the digital baseband signals are subjected to various kinds of signal processing in a signal processing unit 21, to estimate the distance, velocities and angles of the targets to be detected, as desired target data.

Using the same symbols, $v^{TX1}_{RX,n}(t)$ and $v^{TX2}_{RX,n}(t)$, for the various demodulated signals obtained from the reception signals at the respective receiving antennas, they are represented by Expressions (1.7a) and (1.7b) below, where the phase errors, represented by $\Delta\psi^{TX1}(t)$ and $\Delta\psi^{TX2}(t)$ and incurred in demodulation and so forth, are treated as quantities derived from the respective probe signals. In the notation of the various signals, it will be assumed hereafter that, for instance, a time variable t for movement over a time interval [0,$T_f$] denotes movement at times [0,$\delta$t,2$\delta$t, ..., (K-1)$\delta$t], as discretized by $\delta t=T_f/K$.

[Expression 5]

$$v^{TX1}_{RX,n}(t) = \sum_{m=1}^{M} \exp\{j[\omega_c \tau^m(t) + h(t) - h(t - \tau^m(t)) + \phi_n^{TX1,n} + \Delta\psi^{TX1}(t)]\} + n_n^{TX1}(t) \quad (1.7a)$$

$$v^{TX2}_{RX,n}(t) = \sum_{m=1}^{M} \exp\{j[\omega_c \tau^m(t) + h(t) - h(t - \tau^m(t)) + \phi_n^{TX2,n} + \Delta\psi^{TX2}(t)]\} + n_n^{TX2}(t) \quad (1.7b)$$

Expression (1.8) below is obtained upon rearrangement following extraction of phase terms derived from FM down-chirp, in a state where spatial phase and error are removed from Expressions (1.7a) and (1.7b), on the basis of various specifications of radar devices that are actually available in the market. Device specifications for reference include a detectable distance range (minimum and maximum detection distance) from 1 to 200 (m), a detectable velocity range from 1 to 200 (km/h), $\Delta\omega$ of about 50 MHz, and period $T_f$ of a reference signal (modulation input signal to RF-VCO) of about 1 (msec).

[Expression 6]

$$\omega_c \tau^m(t) + h(t) - h(t - \tau^m(t)) = \quad (1.8)$$
$$\omega_c \tau^m(t) - \frac{4\Delta\omega}{T_m}\tau^m(t)\left(t - \frac{\tau^m(t)}{2}\right) + \Delta\omega\tau^m(t) =$$
$$\omega_c \mu^m t - \frac{4\Delta\omega}{T_f}\left(1 - \mu^m - \frac{\mu^m T_f}{4\tau_0^m}\right)\tau_0^m t - \frac{4\Delta\omega}{T_f}\left(1 - \frac{\mu^m}{2}\right)\mu^m t^2 +$$
$$\omega_c \tau_0^m + \Delta\omega\tau_0^m\left(1 + \frac{2\tau_0^m}{T_f}\right) \approx \omega_c \mu^m t - \frac{4\Delta\omega}{T_f}\tau_0^m t + \omega_c \tau_0^m + \Delta\omega\tau_0^m$$

Expressions (1.9a) and (1.9b) below are obtained, with reference to Expression (1.8), by replacing $-4\Delta\omega\tau^m_0/T_f$, which is the frequency component derived from distance delay (opposite sign in case of up-chirp), by $\omega_B^m$, and including a constant term $\omega_c\tau^m_0+\Delta\omega\tau^m_0$ in $\Delta\psi^{TX1}(t)$, $\Delta\psi^{TX2}(t)$.

[Expression 7]

$$v_{RX,n}^{TX1}(t) = \sum_{m=1}^{M} \exp\{j[\omega_c \mu^m t + \omega_B^m t + \phi_n^{TX1,m} + \Delta\psi^{TX1}(t)]\} + n_n^{TX1}(t) \quad (1.9a)$$

$$v_{RX,n}^{TX2}(t) = \sum_{m=1}^{M} \exp\{j[\omega_c \mu^m t + \omega_B^m t + \phi_n^{TX2,m} + \Delta\psi^{TX2}(t)]\} + n_n^{TX2}(t) \quad (1.9b)$$

Figure 3:
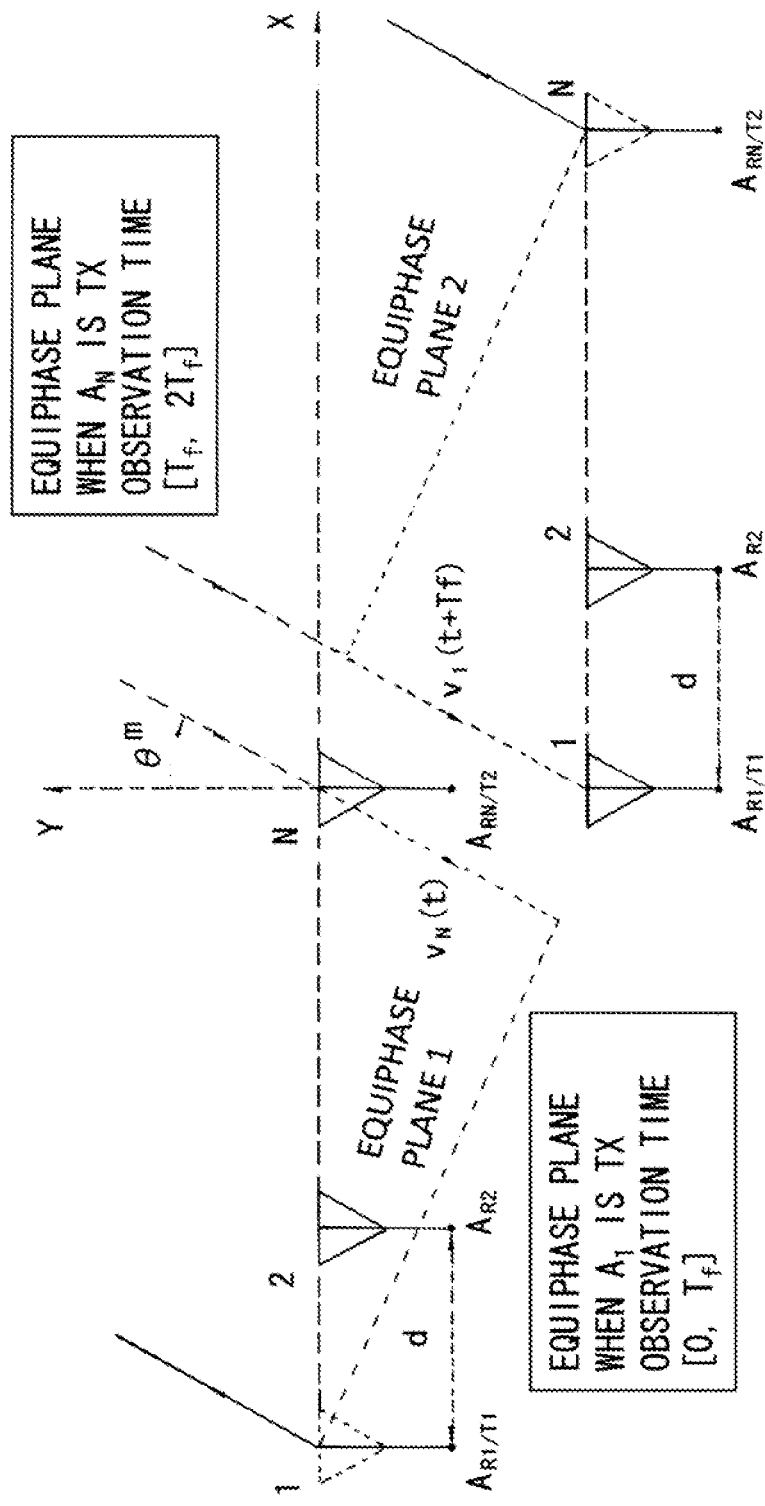
FIG. 3 is a conceptual diagram illustrating a condition under which aperture synthesis is established; hereafter, time slots such that $A_{R1/T1}$, $A_{RN/T2}$ operate as transmission/reception shared elements (observation time: $[0,T_f]$, $[T_f, 2T_f]$ according to a timing chart of FIG. 2) are notated as FM1, FM2 or measurement times A, B, respectively.

FIG. 3 is a conceptual diagram illustrating conditions under which aperture synthesis is established, in an example of an instance where a device operates according to the timing chart of FIG. 2. FIG. 3 illustrates a situation in which a probe signal is radiated by a reference transmitting antenna $A_{T1}$ and a corresponding echo signal is received by a reference receiving antenna $A_{RN}$ at a time slot $[0,T_f]$ (hereafter, also notated as measurement time A). Also, FIG. 3 illustrates a situation in which a probe signal is radiated by a reference transmitting antenna $A_{T2}$ and a corresponding echo signal is received by a reference receiving antenna $A_{R1}$ a time slot $[T_f, 2T_f]$ (hereafter, also notated as measurement time B). As is apparent from FIG. 3, aperture synthesis is established, for respective signals received at measurement times A and B, when a phase length of the signal received by the reference receiving antenna $A_{RN}$ at measurement time A matches a phase length of the signal received by the reference receiving antenna $A_{R1}$ at measurement time B.

In other words, the condition under which aperture synthesis is established for respective demodulated signals $v_{RX,n}^{TX1}(t)$, $v_{RX,n}^{TX2}(t)$ as acquired in the two measurement time bands $[0,T_f]$ and $[T_f, 2T_f]$ is that the phase lengths of the demodulated signals $v_{RX,N}^{TX1}(t)$, $v_{RX,1}^{TX2}(t)$, in combinations (reference paths) of transmitting and receiving antennas that yield a phase reference during synthesis, coincide for both measurement times.

Depending on the device configuration and modulation scheme, and depending on the selection of timing chart, there exists, in some instances, a plurality of combinations of transmitting and receiving antennas for which phase lengths are identical. In the radar device 1, however, combinations of transmitting and receiving antennas for which antenna aperture is maximal after synthesis, and for which phase lengths are identical, are the pair of the transmitting antenna $A_{T1}$ and the receiving antenna $A_{RN}$, and the pair of the transmitting antennas $A_{T2}$ and $A_{R1}$. Therefore, these combinations will be explained as specific examples of reference paths. In the explanation that follows, the transmitting and receiving antennas may be identified with shorter notations, for instance, "TX1" for "$A_{T1}$", and "RX1" for "$A_{R1}$".

Handling the phase errors $\Delta\psi^{TX1}(t)$, $\Delta\psi^{TX2}(t)$ in Expressions (1.9a) and (1.9b) is a problem when carrying out aperture synthesis. The aperture synthesis method in the radar device 1 involves performing a first fast Fourier transform (FFT) on the echo signals (demodulated signals) obtained at respective measurement times, and converting the echo signals into frequency domain data.

In a specific example of $v_{RX,N}^{TX1}(t)$, an element having a k-th ($k=-K/2+1$ to $K/2$) frequency index is given by Expression (1.10) below. The FFT result for the m-th target is represented by Expression (1.11a), excluding the spatial phase. The left side of Expression (1.11a) is obtained from, for instance, Expression (1.11c), if defined as in Expression (1.11b) below. Herein, $g_0^{TX1}=1$ may apply without loss of generality.

[Expression 8]

$$V_{RX,n}^{TX1}(k) = \frac{1}{T_f} \int_{-T_f/2}^{-T_f/2} v_{RX,n}^{TX1}(t) \exp(-jk\omega_f t) dt \quad (1.10)$$

$$\frac{1}{T_f} \int_{-T_f/2}^{-T_f/2} \exp\{j[(\omega_c \mu^m + \omega_B^m - jk\omega_f)t + \Delta\varphi^{TX1}(t)]\} dt = X_k^m \exp[j\Delta\varphi^{TX1}(k)] \quad (1.11a)$$

$$\exp[j\Delta\varphi^{TX1}(t)] = \sum_{n=0}^{\infty} g_n^{TX1} t^n \quad (1.11b)$$

$$\sum_{n=0}^{\infty} \frac{1}{T_f} \int_{-T_f/2}^{-T_f/2} \exp[j(\omega_c \mu^m + \omega_B^m - jk\omega_f)t] g_n t^n dt = \quad (1.11c)$$

$$\frac{1}{T_f} \int_{-T_f/2}^{-T_f/2} \exp[j(\omega_c \mu^m + \omega_B^m - jk\omega_f)t] dt +$$

$$\sum_{n=0}^{\infty} \frac{1}{T_f} \int_{-T_f/2}^{-T_f/2} \exp[j(\omega_c \mu^m + \omega_B^m - jk\omega_f)t] g_n^{TX1} t^n dt =$$

$$X_k^m + \sum_{n=0}^{\infty} D_n^{TX1} = X_k^m \left(1 + \sum_{n=0}^{\infty} \frac{D_n^{TX1}}{X_k^m}\right)$$

In the light of the considerations above, the frequency domain signals converted from time domain signals as expressed in Expressions (1.9a) and (1.9b) can be represented by Expressions (1.12a) and (1.12b) below.

[Expression 9]

$$V_{RX,n}^{TX1}(k) = \exp[j\Delta\psi^{TX1}(k)] \sum_{m=1}^{M} X_k^m \exp(j\phi_n^{TX1,m}) + N_n^{TX1}(k) \quad (1.12a)$$

$$V_{RX,n}^{TX2}(k) = \exp[j\Delta\psi^{TX2}(k)] \sum_{m=1}^{M} X_k^m \exp(j\phi_n^{TX2,m}) + N_n^{TX2}(k) \quad (1.12b)$$

Next, the signal processing unit 21 acquires a phase error $d\psi(k)$ for a respective frequency index k, using a respective demodulated signal corresponding to the reference combination, on the basis of Expression (1.13) below (it should be noted that spatial phases are identical to each other for the reference combination).

Figure 7:
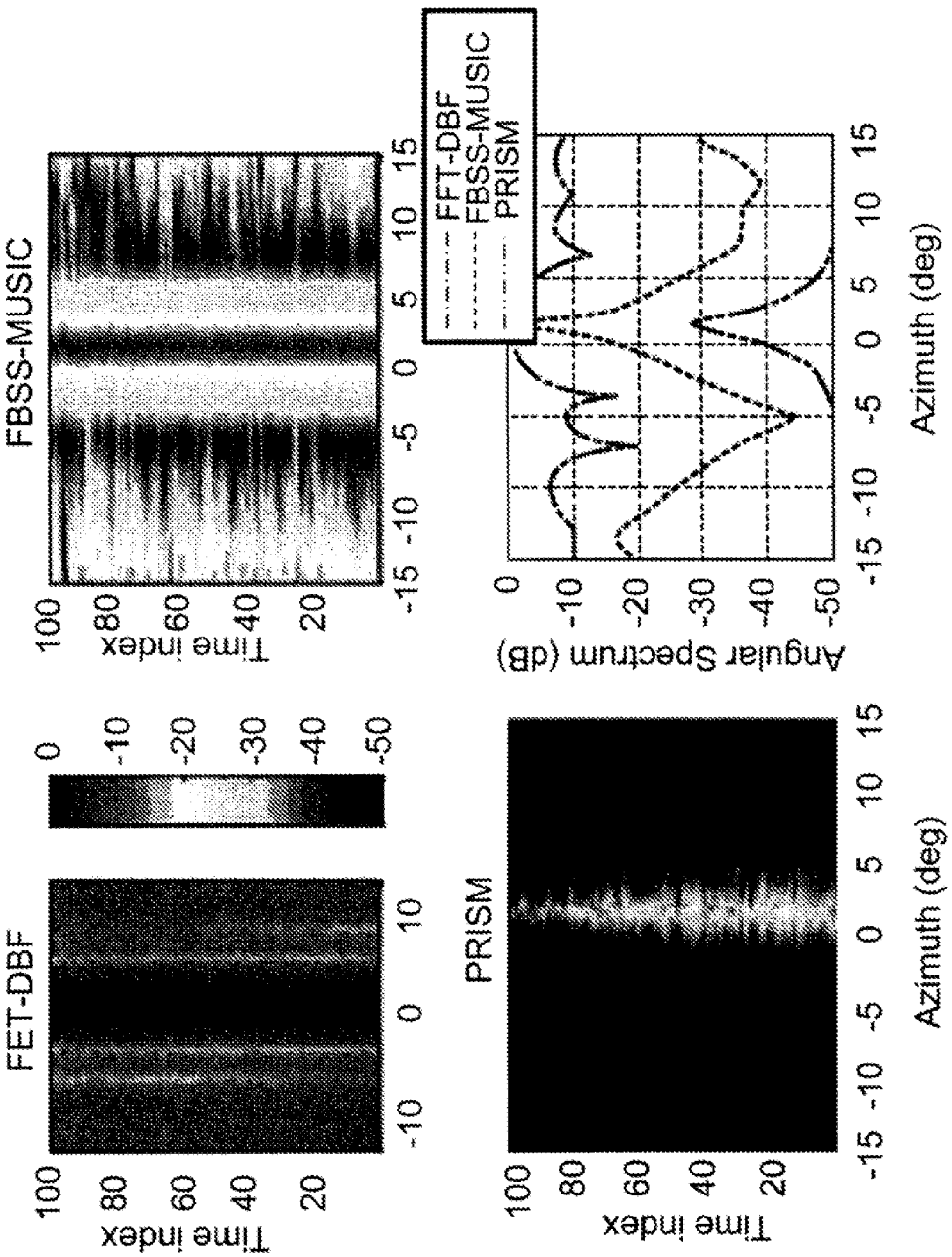
FIG. 7 is a set of graphs illustrating angle measuring results in a case where phase differences in the time domain are canceled for the time domain signals of FIG. 6.

Lastly, the signal processing unit 21 multiplies the correction amount $\exp[-jd\psi(k)]$ based on the phase error $d\psi(k)$ by all the n and k of $V^{TX2}{}_{RX,n}(k)$, to conform thereby the phase error of $V^{TX2}{}_{RX,n}(k)$ to the phase error $\Delta\psi^{TX1}(t)$ of $V^{TX1}{}_{RX,n}(k)$. Aperture synthesis was established as a result. The aperture synthesis signal obtained by the signal processing unit 21 of the radar device of FIG. 7 is represented by Expressions (1.14a) and (1.14b) below (for the sake of simplification, the influence of additive noise components has been overlooked).

[Expression 10]

$$d\varphi(k) \equiv \arg[V_{RX,1}^{TX2}(k)] - \arg[V_{RX,N}^{TX1}(k)] = \Delta\psi^{TX2}(k) - \Delta\psi^{TX1}(k) \quad (1.13)$$

$$V_{RX,n}^{TX1}(k) = \exp[j\Delta\psi^{TX1}(k)]\sum_{m=1}^{M} X_k^m \exp(j\phi_n^{TX1,m}) + N_n^{TX1}(k) \quad (1.14a)$$

$$V_{RX,n}^{TX2}(k) = \exp[j\Delta\psi^{TX1}(k)]\sum_{m=1}^{M} X_k^m \exp(j\phi_n^{TX2,m}) + N_n^{TX2}(k) \quad (1.14b)$$

In order to estimate an angle of the target to be detected from the respective signals, such as those in Expressions (1.14a) and (1.14b), the signals of the reference receiving antenna after having being subjected to aperture synthesis are defined by the following Expression (1.15), on the basis of the fact that the spatial phases of the respective signals of the reference receiving antennas are identical to each other. Further, a vector V(k), a noise signal vector N(k), an angular matrix A and a target signal vector X(k), having, as elements, the signals of the reference receiving antenna previously defined and the signals received by the other respective receiving antennas, are defined according to Expressions (1.16a), (1.16b), (1.16c), and (1.16d), respectively, to thereby derive, for the aperture-synthesized signal, a basic relational expression of array signal processing such as that of Expression (1.17) (needless to say, except for the angular matrix, the respective expressions are notations related to the signal elements in which the frequency index is k).

[Expression 11]

$$V_{RX,C}^{TX1/2}(k) = \frac{V_{RX,N}^{TX1}(k) + V_{RX,1}^{TX2}(k)}{2} = \quad (1.15)$$

$$\exp[j\Delta\psi^{TX1}(k)]\sum_{m=1}^{M} X_k^m \exp[j\phi_n^{TX1,m}] + N_C^{TX1/2}(k)$$

$$V(k) = [V_{RX,1}^{TX1}(k) \ \ldots \ V_{RX,N-1}^{TX1}(k) V_{RX,C}^{TX1/2}(k) V_{RX,2}^{TX2}(k) \ \ldots \ V_{RX,N}^{TX2}(k)]^T \quad (1.16a)$$

$$N(k) = [N_{RX,1}^{TX1}(k) \ \ldots \ N_{N-1}^{TX1}(k) N_C^{TX1/2}(k) N_2^{TX2}(k) \ \ldots \ N_N^{TX2}(k)]^T \quad (1.16b)$$

-continued $$A = \begin{bmatrix} \exp(j\phi_1^{TX1,1}) & \ldots & \exp(j\phi_1^{TX1,M}) \\ \vdots & & \vdots \\ \exp(j\phi_{N-1}^{TX1,1}) & & \exp(j\phi_{N-1}^{TX1,M}) \\ \exp(j\phi_N^{TX1,1}) & & \exp(j\phi_N^{TX1,M}) \\ \exp(j\phi_2^{TX2,1}) & & \exp(j\phi_2^{TX2,M}) \\ \vdots & & \vdots \\ \exp(j\phi_N^{TX2,1}) & & \exp(j\phi_N^{TX2,M}) \end{bmatrix} \quad (1.16c)$$

$$X(k) = [X_k^1 \ \ldots \ X_k^M]^T \quad (1.16d)$$

$$V(k) = \exp[j\Delta\psi^{TX1}(k)]AX(k) + N(k) \quad (1.17)$$

The signal processing unit 21 illustrated in FIG. 1 performs processes in accordance with known angle estimation methods (angle measurement algorithms) such as DBF (Digital Beam Forming), MUSIC (MUltiple SIgnal Classification) or PRISM (PRopagator method based on an Improved Spatial-smoothing Matrix).

In the above-described comparative example, two antennas operate as transmitting antennas at two measurement time bands; echo signals from a target to be detected is received by N sets of receiving antennas, and the echo signals are synthesized if it is deemed that the phase lengths in a reference path at which spatial phases are identical become equal to each other. As a result, a function can be realized such that signals are received simultaneously using a radar device (detection and ranging apparatus) that is provided with a reception array antenna comprising 2N−1 antenna elements (in other words the effective aperture can be expanded).

However, aperture synthesis failed sometimes to work properly in a scene where there exists a plurality of targets to be detected at the same distance away from a measurement position, and the targets to be detected move with a small velocity difference with respect to each other (for instance, in a state where a vehicle in which the radar device is installed gets into a traffic jam).

Figure 4:
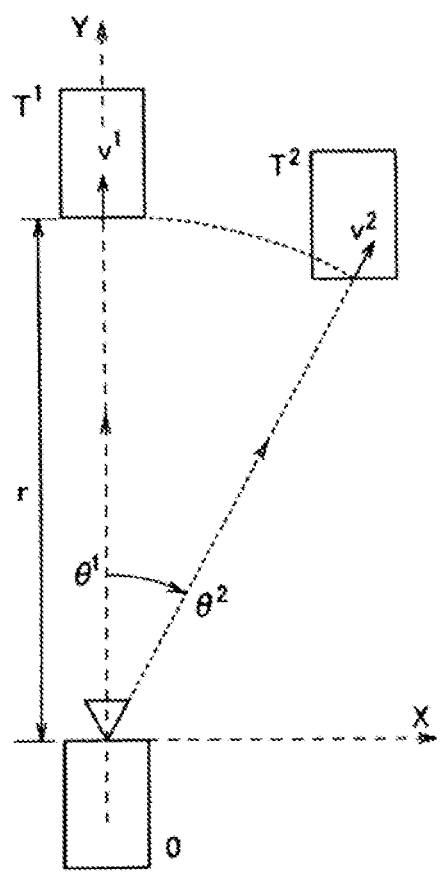
FIG. 4 is a diagram illustrating a scene setting example.

FIG. 4 is a diagram illustrating a scene setting example. In the disclosure below, the problem on the radar device illustrated in FIG. 1 will be tackled on the basis of mathematical expressions using the scene setting illustrated in FIG. 4. In the scene setting of FIG. 4, two targets to be detected $T^1$ and $T^2$ are present at positions lying at the same distance ($r^1=r^2=r$) from the radar device O of FIG. 1, at angles $\theta^1$ and $\theta^2$, such that the targets move at respective velocities $v^1$ and $v^2$.

In an enumeration of the various parameters of the radar device used in calculation examples, a system reference signal outputted by the oscillator module 22 is an FMCW signal having a carrier frequency of 76 Gigahertz (GHz) ($=\omega_c/2\pi$), with a basic period $T_f$ of the modulation input signal (reference signal) to the RF-VCO of 4 (msec) and a one-sided modulation band of 50 (MHz) ($=\Delta\omega/2\pi$). The number of antenna elements N is four, a spacing d between antenna elements is 1.8λ (where λ is the wavelength of the carrier signal), and the number K of samples is 512. The various parameters (distance, angle, velocity) of each target to be detected in the scene setting of FIG. 4 were, hypothetically, $T^1$: (40 (m), 0 (deg), 10 (km/h)) and $T^2$: (40 (m), 3(deg), 11 (km/h)) and SNR was 30 (dB). The target parameters may be modified slightly depending on each calculation example.

Figure 5:
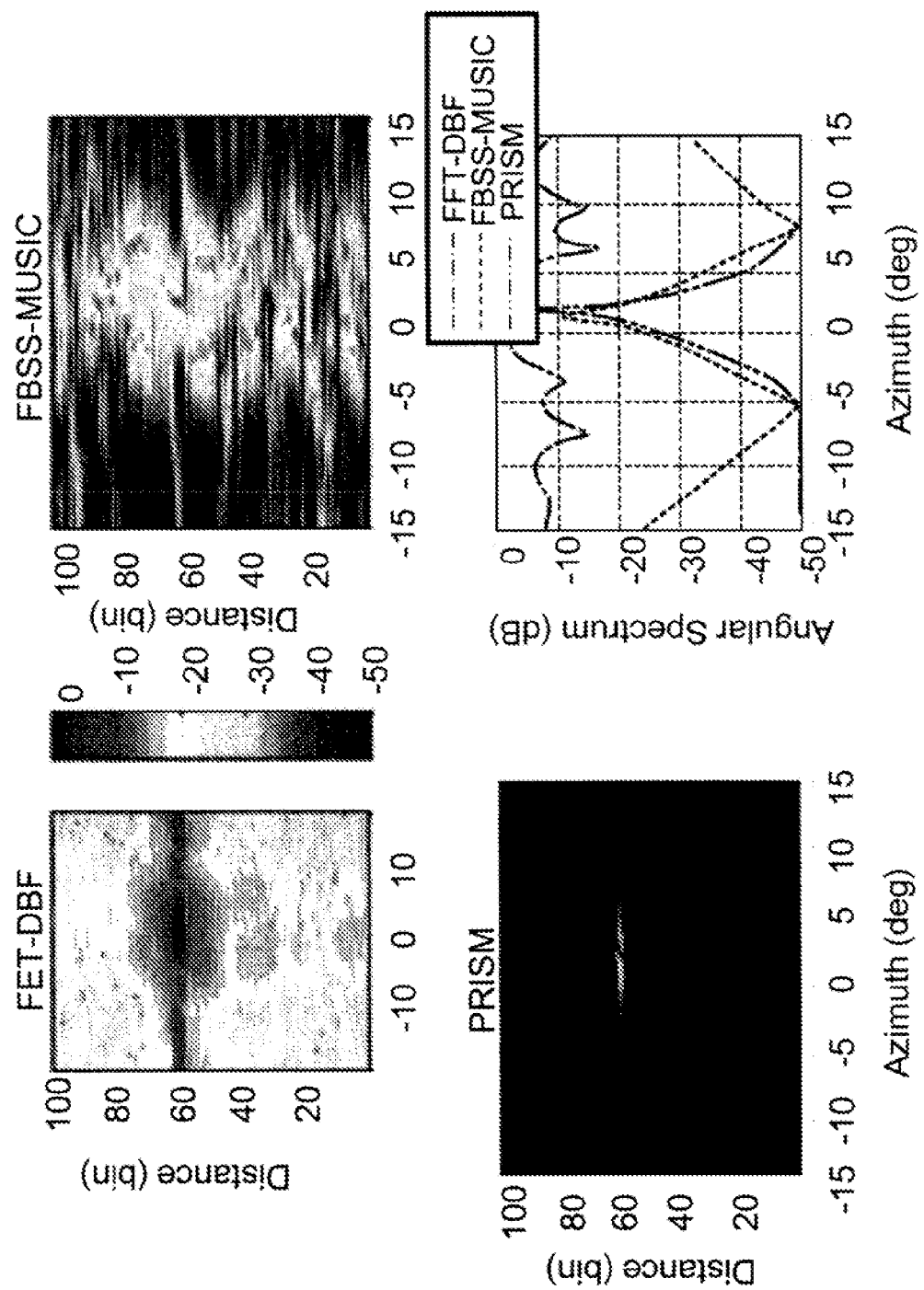
FIG. 5 is a set of graphs illustrating results upon performing angle measuring using the radar device of FIG. 1.

Using the various parameters above, an aperture synthesis operation was performed, in accordance with the procedure described earlier, in the radar device 1 according to the comparative example, and angle measuring was performed in the frequency domain, to yield results such as those illustrated in FIG. 5. FIG. 5 is a set of graphs illustrating angle measurement results in the radar device 1 (FIG. 1) according to the comparative example. The distance of the targets to be detected can be estimated, substantially accurately, by virtue of the results illustrated in FIG. 5, but two targets to be detected, one at 0 degrees and another at 3 degrees, are erroneously estimated as one target to be detected that is present at around 1.5 degrees.

Figure 6:
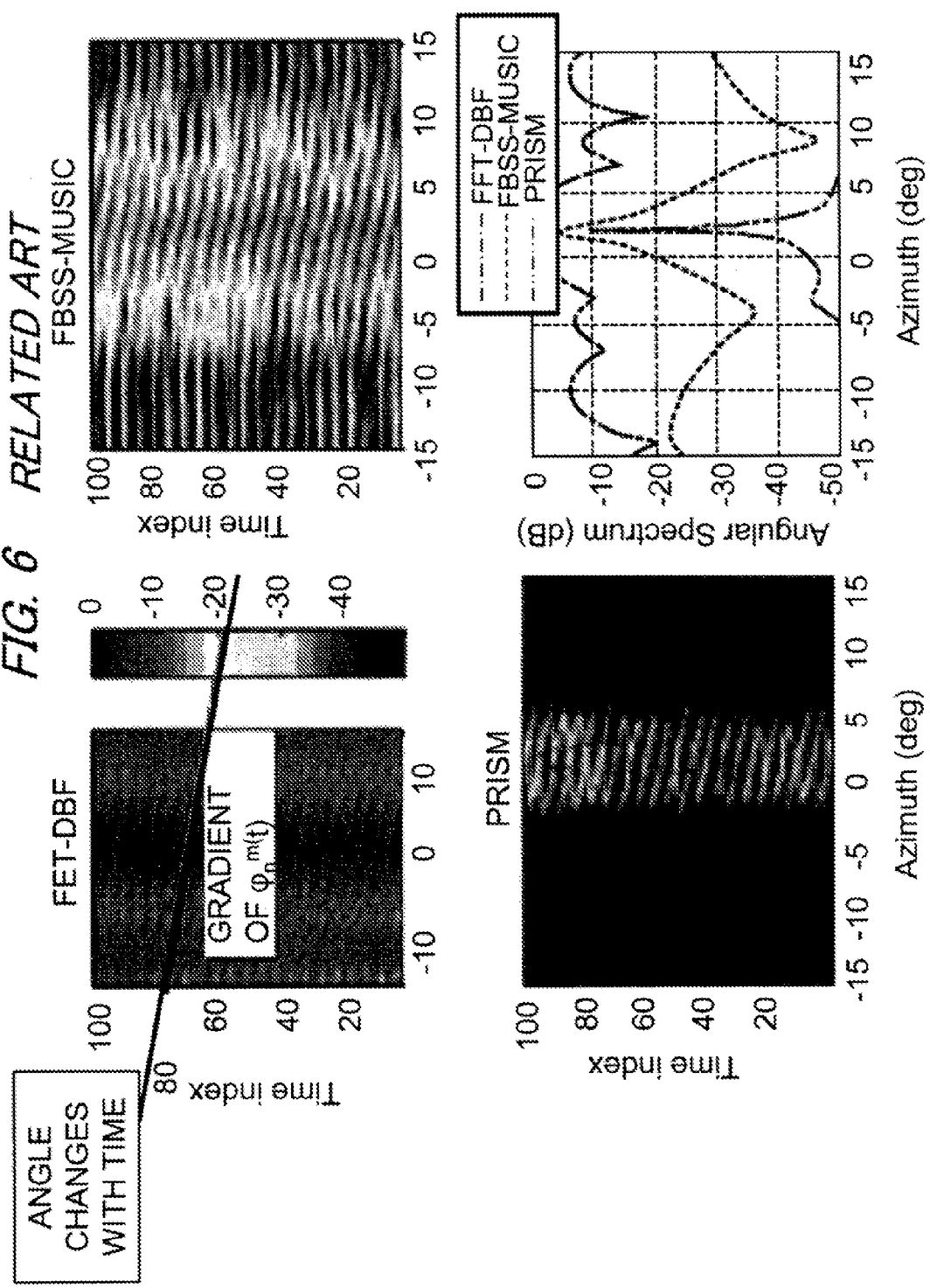
FIG. 6 is a set of graphs illustrating results upon conversion of frequency domain signals used in FIG. 5 to time domain signals, and upon performing angle measuring.

Such being the case, and in order to determine the causes of this erroneous estimation, an inverse Fourier transform was performed on the above-mentioned synthesis signal (Expression (1.17)), to transform again thereby the synthesis signal into a time domain signal. Thereafter, an angle measurement algorithm was applied to the time domain signal having been thus re-transformed. FIG. 6 is a set of graphs illustrating the angle measurement results for a time domain signal, as transformed from the frequency domain signal used in FIG. 5. In the graphs illustrating the angle measurement results of DBF, MUSIC and PRISM (upper left graph, upper right graph and lower left graph), a target angle that is supposed to be time-invariant (referred to in the figure as slope (gradient) of the spatial phase $\phi^{TX1/2,m}_n(t)$) does change over time.

In this example, the relative velocity difference between the two targets to be detected is 1 (km/h) ($\cong 0.28$ [m/sec]). Therefore, a distance difference between the targets to be measured, arising from the velocity difference for each $T_f$ (=4 (msec)) time, is merely about 1.1 (mm), which is a far smaller value than the distance resolution ($\cong 0.75$ (m)) of the device. In other words, the distances of the targets to be detected can be regarded as being identical over the two measurement times. Accordingly, the frequencies $\omega_B^1$ and $\omega_B^2$ determined by the distance delay may be thought of as being substantially a same value $\omega_B$ (refer to Expression (2.1). Specifically, the frequencies $\omega_B^1$ and $\omega_B^2$ are about 13 (kHz) at 40 (m). Such being the case, Expressions (1.9a) and (1.9b) can be rewritten as Expressions (2.2a) and (2.2b).

[Expression 12]

$$\omega_B^1 \approx \omega_B^2 = \omega_B = \frac{4\Delta\omega}{T_f}\tau_0^m = \frac{8\Delta\omega r}{T_f c} \quad (2.1)$$

$$v_{RX,n}^{TX1}(t) = \exp\{j[\omega_B t + \Delta\psi^{TX1}(t)]\}\sum_{m=1}^{M}\exp[j(\omega_c\mu^m t + \phi_n^{TX1,m})] + n_n^{TX1}(t) \quad (2.2a)$$

$$v_{RX,n}^{TX2}(t) = \exp\{j[\omega_B t + \Delta\psi^{TX2}(t)]\}\sum_{m=1}^{M}\exp[j(\omega_c\mu^m t + \phi_n^{TX2,m})] + n_n^{TX2}(t) \quad (2.2b)$$

Considering now the spatial phase and phase corresponding to the Doppler frequency, it is found that, for instance, the term in the brackets of exp of the summation term of $v^{TX1}_{RX,n}(t)$ in Expression (2.2a) may be represented by Expression (2.3a) below. According to Expression (2.3a), it is found that a time-invariant spatial phase $(n-1)d \sin(\theta^m)$ becomes of an order comparable to that of a Doppler phase shift $2v^m t$ that varies with time (the Doppler frequency is about 1.4 (kHz) at 10 (km/h)).

As a result, as illustrated in FIG. 6, it is found that there may occur a phenomenon (behavior whereby an angle that is supposedly time-invariant varies with time) that is observed upon angle estimation in the time domain. It is deemed that such a phenomenon gives rise to problems such as the above-described ones (erroneous estimation as illustrated in FIG. 5).

[Expression 13]

$$\omega_c\mu^m t + \phi_n^{TX1,m} = \frac{2\pi}{\lambda}[2v^m t - (n-1)d\sin(\theta^m)] \quad (2.3a)$$

$$\omega_c\mu^m t + \phi_n^{TX2,m} = \frac{2\pi}{\lambda}[2v^m t - (N+n-2)d\sin(\theta^m)] \quad (2.3b)$$

Such being the case, a conceivable way of solving the above-described problem involves performing firstly a correction that includes the influence of Doppler phase shift that varies with time, through cancelation of phase differences between signals in the time domain. Specifically, a correction amount is calculated according to Expression (2.4) below using Expression (2.2) for a reference combination. All n and t of $v^{TX2}_{RX,n}(t)$ are multiplied by $\exp[-jd\psi(t)]$ using the correction amount, to conform thereby the phase error of $v^{TX2}_{RX,n}(t)$ to the phase error $\Delta\psi^{TX1}(t)$ that is common to the phase error of $v^{TX1}_{RX,n}(t)$. Synthesis aperture is performed thereafter.

[Expression 14]

$$d\psi(t) \cong \arg[v_{RX,1}^{TX2}(t)] - \arg[v_{RX,N}^{TX1}(t)] = \Delta\psi^{TX2}(t) - \Delta\psi^{TX1}(t) \quad (2.4)$$

FIG. 7 is a set of graphs illustrating results arrived at by using the angle measurement algorithm on the signals thus obtained. In FIG. 7, the signal phase difference is cancelled in the time domain, to cancel thereby changes in angle with time as expected. However, the number and angles of the targets to be detected remain still erroneously estimated.

Therefore, a reassessment of Expressions (2.2a) and (2.2b) reveals that the frequency determined by distance delay is about 13 kHz, whereas the Doppler frequency is 1.4 kHz, i.e. about $\frac{1}{10}$. Accordingly, Expressions (2.2a) and (2.2b) may be regarded as expressions resulting from performing amplitude modulation on the carrier signal $\exp(j\omega_B t)$ by the time-variant terms within the summation symbol (needless to say, the carrier signal as termed herein is not the system carrier signal of frequency $\omega_c$). That is, the summation term alone of $v^{TX1}_{RX,n}(t)$ is extracted from Expression (2.2a), and the expression is reorganized to yield Expression (2.5).

[Expression 15]

$$\sum_{m=1}^{M}\exp[j(\omega_c\mu^m t + \phi_n^{TX1,m})] =$$
$$\exp[j(\omega_c\mu^1 t + \phi_n^{TX1,1})] + \exp[j(\omega_c\mu^2 t + \phi_n^{TX1,2})] =$$
$$\exp\left[j\frac{(\omega_c\mu^2 t + \phi_n^{TX1,2}) + (\omega_c\mu^1 t + \phi_n^{TX1,1})}{2}\right]2$$
$$\cos\left[\frac{(\omega_c\mu^2 t + \phi_n^{TX1,2}) - (\omega_c\mu^1 t + \phi_n^{TX1,1})}{2}\right] =$$
$$\exp\left[j\frac{\omega_c(\mu^2 + \mu^1)t + (\phi_n^{TX1,1} + \phi_n^{TX1,2})}{2}\right]2$$
$$\cos\left[\frac{\omega_c(\mu^2 - \mu^1)t + (\phi_n^{TX1,2} - \phi_n^{TX1,1})}{2}\right] \quad (2.5)$$

The rightmost side of Expression (2.5) means that, as a result of synthesizing the signals from two targets, the signal is substantially regarded, in the signal processing unit, as one signal that is represented by a product of a complex component exp( ) and a real number component cos( ). That is, the complex component behaves as if there existed one target to be detected having an average Doppler frequency and average angle of the two targets to be detected. A beat component, the real component, is generated from the Doppler signals of the two targets to be detected. The beat component constitutes an envelope of amplitude modulation (AM) components.

The signal resulting from performing amplitude modulation (AM), by the above-described beat signal, on a complex signal derived from the above-described pseudo-single target, constitutes the substance of Expression (2.5). This is the reason why the erroneous estimation of the number and angles of the targets to be detected was not solved even if the change in angle with time was corrected by performing aperture synthesis based on phase correction in the time domain. It is apparent that the beat signal (AM component) between the Doppler signals of the original targets to be detected is worked out as the envelope of Expression (2.5) (generally, Expressions (1.9) and (2.2)).

Figure 8:
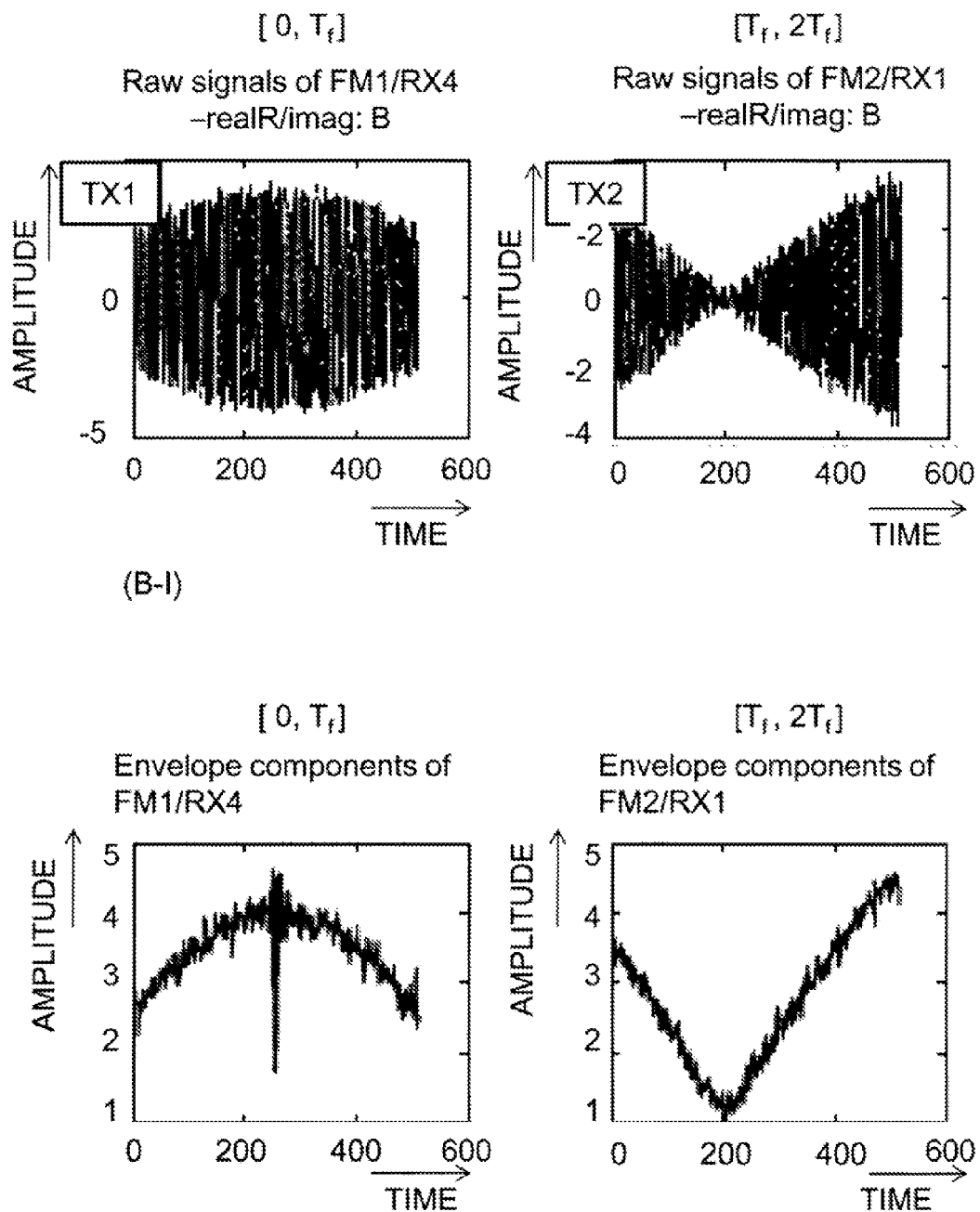
FIG. 8 is a graph illustrating echo signals, and envelopes thereof, of reference paths acquired by the radar device of the comparative example.

FIG. 8 is a set of graphs illustrating concurrently a demodulated signal in the reference receiving antenna and a envelope signal (AM component) obtained by subjecting the demodulated signal to a Hilbert transform, in order to verify the validity of the conclusion set forth above. The respective demodulated signals (Expressions (2.2a) and (2.2b)) are depicted at the top, and the respective envelope signals at the bottom.

FIG. 8 shows that the phases of the reception signals obtained in two measurement times periods [0, Tf] and [Tf, 2Tf] are significantly dissimilar depending on the influence of the envelope. Further, the frequencies of the respective envelope signals (when regarded as bipolar signals) are about 73Hz, i.e. far smaller than 500 Hz, which is the minimum frequency resolution of the device. Therefore, it is apparent that aperture synthesis cannot be performed accurately even if phase correction is carried out in the frequency domain.

First Embodiment

Figure 9:
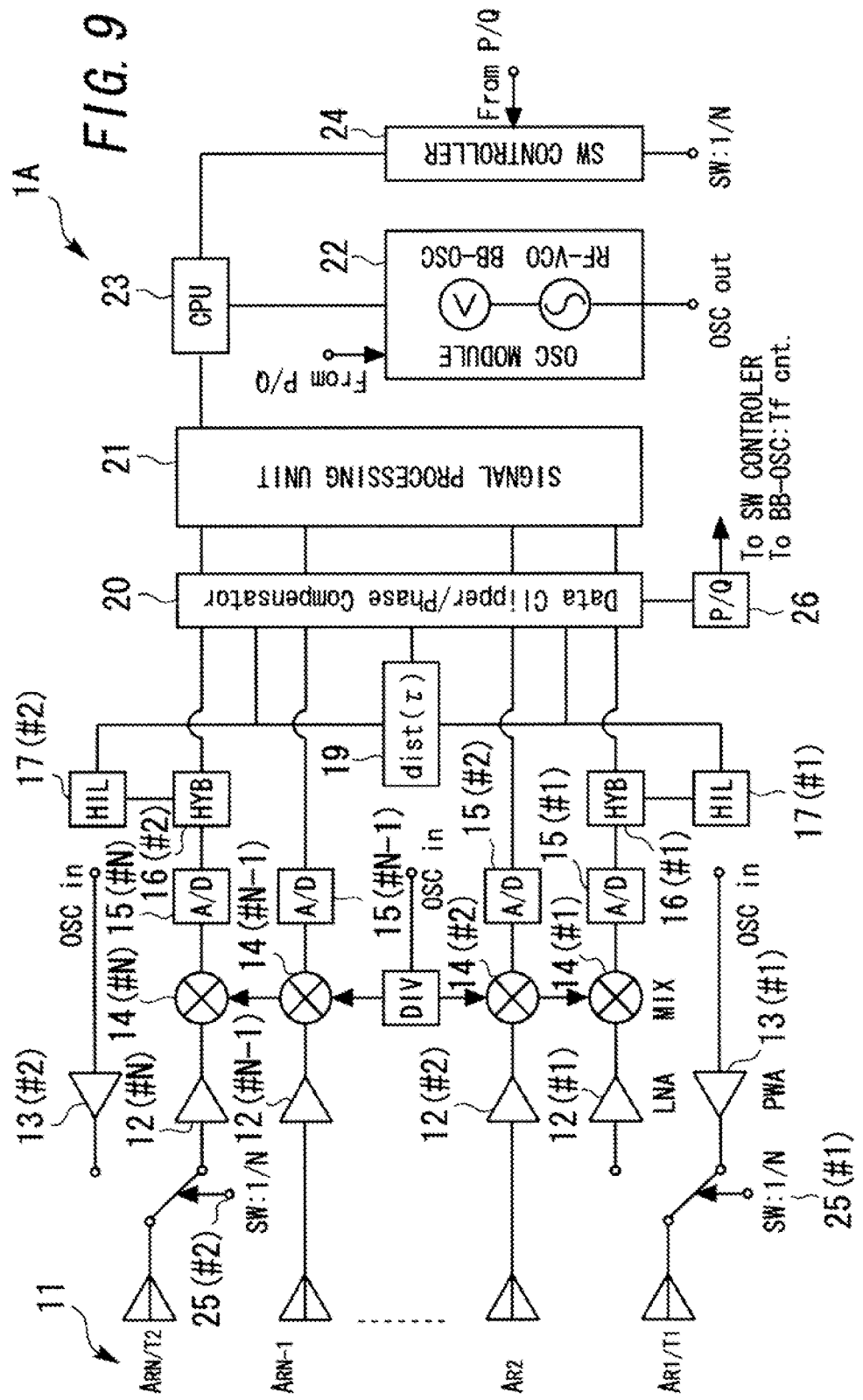
FIG. 9 is a block diagram illustrating the configuration of a radar device according to a first embodiment.

A detection and ranging apparatus according to a first embodiment of the invention is explained next. FIG. 9 illustrates a configuration example of a radar device being a specific example of a detection and ranging apparatus according to the first embodiment. Constituent elements common to those in the comparative example illustrated in FIG. 1 will be denoted with the same reference numerals. A radar device that uses a FMCW (Frequency Modulated Continuous Wave) as the probe signal will be explained as the radar device according to the embodiment. The radar device is envisaged for being supported on a moving object such as a vehicle.

In FIG. 9, a radar device 1A has an array antenna 11 having the same configuration as that in the comparative example; low noise amplifiers (LNAs) 12; power amplifiers (PWAs) 13, mixers (MIX in FIG. 9) 14; A/D converters 15 (may be configured so as to be equipped with a memory that temporarily stores digital data therein); branching units (hybrid: HYB) 16; envelope detection units (HIL) 17; an integrated distance calculation unit (dist (τ)) 19; a data clipper (Data Clipper) and phase correction unit (Phase Compensator) 20; a signal processing unit (Data Processing Unit) 21; an oscillator module 22; a CPU (Central Processing Unit) 23; a switch controller (SW Controller) 24; switches (SW) 25; and a transmission cycle setting unit (P/Q) 26. Those respective units are realized by software constituent elements, hardware constituent elements, or a combination of the foregoing (refer to the [Others] section).

The oscillator module 22 such as a DDS (Direct Digital Synthesizer) may be so configured as to directly generate, digitally, an FMCW signal. In FIG. 9 there is illustrated a circuit configuration of ordinary analog type, i.e. a combination of a baseband oscillator (BB-OSC) and a high-frequency voltage control oscillator (RF-VCO, which may obviously be of current-controlled type). In the oscillator module 22, a reference signal output from the BB-OSC is sent to the RF-VCO, and the RF-VCO outputs a system reference signal that is frequency-modulated based on the reference signal. For instance, a triangular wave (FIG. 10) is used as the reference signal.

Each PWA (HPA) 13 is provided in a processing system corresponding to a transmitting antenna. In the example of FIG. 9 there are provided two PWAs 13 (#1) and PWAs 13 (#2) corresponding to the two transmitting antennas $A_{T1}$ and $A_{T2}$ that are used as the transmitting antenna. The PWAs 13 amplify the system reference signal outputted from the oscillator module 22. The system reference signal outputted by the PWAs 13 is outputted as a probe signal for target detection from one antenna that is selected as the transmitting antenna, from among the transmitting antennas $A_{T1}$ and $A_{T2}$.

The array antenna 11 has N antenna (sensor) elements that are arranged at respective dissimilar spatial positions. For example, the array antenna 11 forms a uniform linear array antenna (ULA (Uniform Linear Array) antenna) in which the respective antenna elements are linearly arranged at regular intervals. In the example of FIG. 9, two antenna elements at both ends, from among the antenna elements that are arranged linearly, are used (shared) for both transmission and reception. The other antenna elements are dedicated for reception. Hereafter, antenna elements that are used for transmission and reception are notated as shared antennas $A_{R1/T1}$, $A_{RN/T2}$.

The shared antennas $A_{R1/T1}$, $A_{RN/T2}$ can switch between transmission and reception, in time division, by way of the switches 25. The antenna elements that operate as receiving antennas are notated as $A_{R1}$ through $A_{RN}$, and the antenna elements that operate as transmitting antennas are notated as $A_{T1}$ and $A_{T2}$. In the radar device 1A, thus, an aperture enlarging technique is used in which a plurality of transmitting antennas and a plurality of receiving antennas are combined to increase thereby the number of effective receiving antennas.

The switches 25 switch respective shared antennas $A_{R1/T1}$, $A_{RN/T2}$ between a transmission state and a reception state, in accordance with a control signal from the switch controller 24. Specifically, the shared antennas $A_{R1/T1}$ are switched, by the switch 25 (#1), between a transmission state of being connected to the PWA 13 (#1) and a reception state of being connected to the LNA 12 (#1). The shared antenna $A_{R1/T1}$ operates as the transmitting antenna $A_{T1}$ in a transmission state, and operates as the receiving antenna $A_{R1}$ in a reception state. Likewise, the shared antenna $A_{RN/T2}$ is switched, by the switch 25 (#2), between a transmission state of being connected to the PWA 13 (#2) and a reception state of being connected to the LNA 12 (#N). The shared antenna $A_{RN/T2}$ operates as the transmitting antenna $A_{T2}$ in a transmission state, and operates as the receiving antenna $A_{RN}$ in a reception state.

The switch controller 24 controls the switching timing of the switches 25 in accordance with the transmission cycle information (P/Q) sent by the CPU 23 and in accordance with the period $T_f$ of the reference signal that is outputted by the baseband oscillator of the oscillator module 22.

The transmission cycle setting unit 26 sends, to the CPU 23, an update instruction of the transmission cycle information (P/Q) or the period $T_f$ of the reference signal according to a request by the signal processing unit 21. The transmission cycle information (P/Q) denotes a ratio (P) of time slots that use the transmitting antenna $A_{T1}$ and a ratio (Q) of time slots that use the transmitting antenna $A_{T2}$, with the period $T_f$ of the reference signal being taken as one unit (the duty ratio upon switching of the respective shared antennas for transmission or reception during one time slot is ignored).

During $PT_f(=P \times T_f)$, the switch controller 24 uses the shared antenna $A_{RN/T2}$ as the receiving antenna $A_{RN}$, and uses the shared antenna $A_{R1/T1}$ as the receiving antenna $A_{R1}$ and the transmitting antenna $A_{T1}$ while switching in a predetermined period. During $QT_f(=Q \times T_f)$, the switch controller 24 uses the shared antennas $A_{R1/T1}$ as the receiving antenna $A_{R1}$, and uses the shared antenna $A_{RN/T2}$ as the receiving antenna $A_{RN}$ and the transmitting antenna $A_{T2}$ while switching in the predetermined period.

Figure 10:
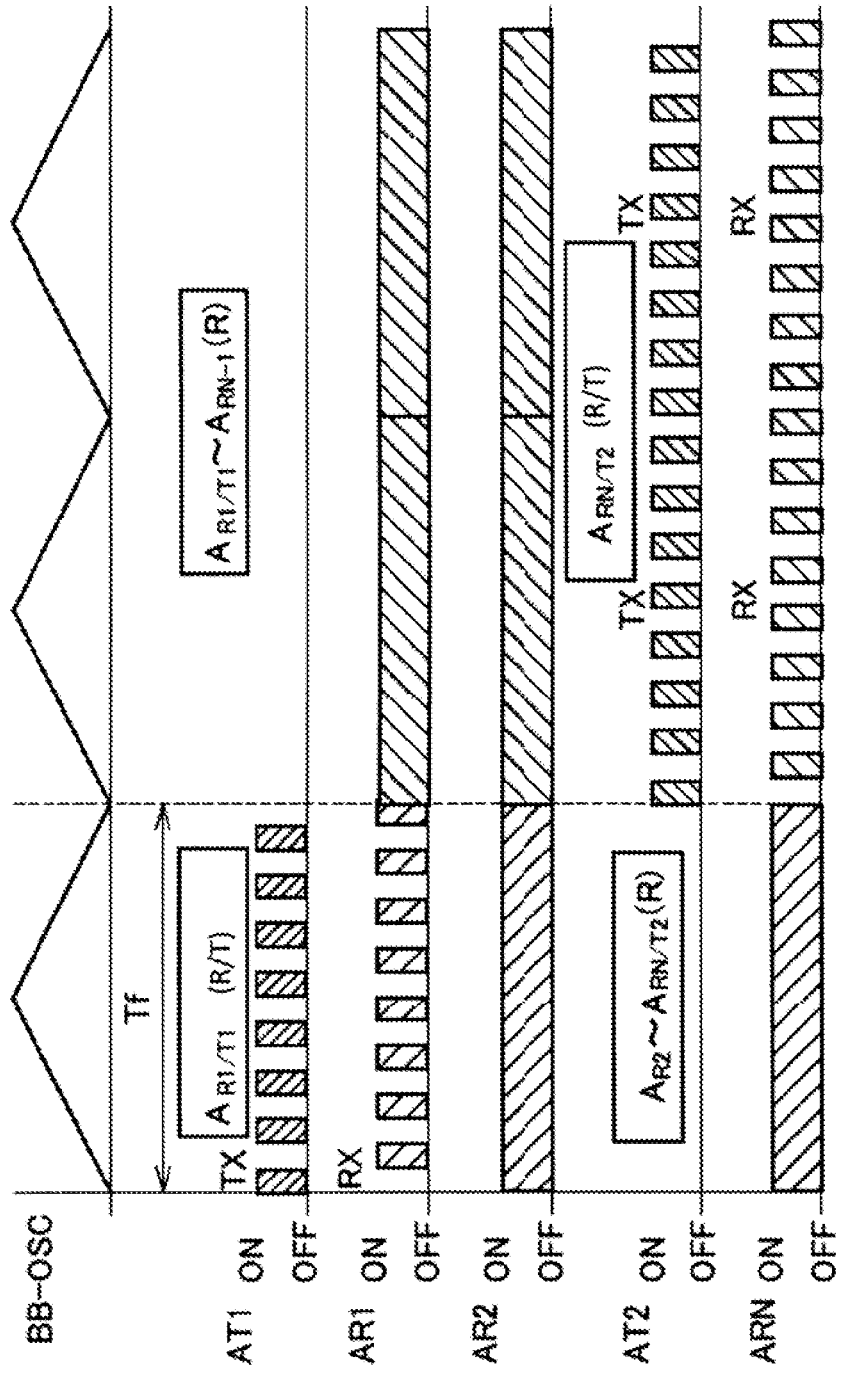
FIG. 10 is a time chart illustrating the operation of the radar device illustrated in FIG. 9.

FIG. 10 is a timing chart illustrating transmission and reception timing in a case where transmission cycle information (P=1, Q=2) is used. Time flows from the left to the right on the paper. At time $[0, T_f]$ in the example illustrated in FIG. 10, the transmitting antenna $A_{T1}$ radiates probe signals in a predetermined period $T_f$, and the receiving antenna $A_{RN}$ receives continuously an echo signal. In the measurement time $[T_f, 3T_f]$, the transmitting antenna $A_{T2}$ radiates probe signals throughout a predetermined time interval $(2T_f)$, and the receiving antenna $A_{R1}$ receives continuously the echo signal.

With reference to the timing chart of FIG. 10, "one period of operation as the device" according to the embodiment, with the measurement start time taken as 0, corresponds to the operation of the shared antenna $A_{R1/T1}$ as the shared antenna, and to the operation of antennas $A_{R2}$ to $A_{RN}$ in the time slot $[0, PT_f]$ as receiving antennas. At a time slot $[PT_f, (P+Q)T_f]$, the antenna $A_{RN/T2}$ operates as a shared antenna, and the antennas $A_{R1}$ to $A_{RN-1}$ operate as receiving antennas.

Returning now to FIG. 9, each LNA 12 is provided in a processing system corresponding to a receiving antenna; In the example of FIG. 9, an LNA 12 (#2) through an LNA 12 (#N−1) are connected at all times to respective receiving antennas $A_{R2}$ through $A_{RN-1}$. The LNA 12 (#1) is connected to the receiving antenna $A_{R1}$ through switching by the switch 25 (#1). An LNA 12 (#N) is connected to the receiving antenna $A_{RN}$ through switching by a switch 25 (#2). Each LNA 12 receives an echo signal (reception signal) from the connected receiving antenna, and amplifies the reception signal. The amplified signals are transmitted to the mixers 14.

The mixers 14 (14(#1) to (#N)) are connected to respective LNAs 12. The mixers 14 mix the signals amplified by each LNA 12 with the system reference signal transmitted from the oscillator module 22, to convert thereby reception signals to baseband signals (demodulated signals).

Each A/D converter 15 converts the baseband signal outputted from a respective the mixer 14 into a digital baseband signal at a predetermined sampling frequency. Hereafter, the digital baseband signal may also be referred to as demodulated signal, echo signal or baseband signal by the context.

The HYBs 16 are provided in the respective processing systems corresponding to the receiving antennas $A_{R1}$ and $A_{RN}$, in order to process demodulated signals of the signals received by the receiving antennas $A_{R1}$ and $A_{RN}$. Specifically, an HYB 16 (#1) is connected to an A/D converter 15 (#1), and an HYB 16 (#2) is connected to an A/D converter 15 (#N).

In other words, each HYB 16 is provided in a processing system that processes a signal received by a receiving antenna of a combination of a transmitting antenna and the receiving antenna the spatial phases whereof are equal to each other, within the array antenna 11. Accordingly, the site at which the HYB and HIL are installed need not be limited to the receiving antennas on the outermost edges of the array antenna, as in FIG. 9. The aperture synthesis operation is executed on the basis of a signal received through a combination of transmitting antenna and receiving antenna that yields thus an equal spatial phase as described above. Hereafter, a combination of a transmitting antenna and a receiving antenna used as an aperture synthesis reference will be called a reference combination, and a transmitting antenna and a receiving antenna in the reference combination will be called a reference transmitting antenna and a reference receiving antenna.

In the first embodiment, the combination of the reference transmitting antenna $A_{T1}$ and the reference receiving antenna $A_{RN}$, and the combination of the reference transmitting antenna $A_{T2}$ and the reference receiving antenna $A_{R1}$ constitute reference combinations for which the aperture magnification is best. The pathway of the signals transmitted and received in the reference combination will be called a "reference path". Other specific reference combinations that are conceivable include a combination of the reference transmitting antenna $A_{T1}$ and the reference receiving antenna $A_{R1}$, and a combination of the reference transmitting antenna $A_{T2}$ and the reference receiving antenna $A_{RN}$. In this case, a reference phase length is zero. The language reference combination and reference path may be used without distinction.

FIG. 3 can illustrate the conditions under which there is established aperture synthesis in an instance where the radar device 1A operates according to the timing chart of FIG. 10. FIG. 3 illustrates a situation in which a probe signal is radiated by the reference transmitting antenna $A_{T1}$ and the corresponding echo signal is received by the reference receiving antenna $A_{RN}$ at the time slot $[0, T_f]$ (hereafter also referred to as measurement time A). Also, FIG. 3 illustrates a situation in which a probe signal is radiated by the reference transmitting antenna $A_{T2}$ and a corresponding echo signal is received by the reference receiving antenna $A_{R1}$ at a time slot $[T_f, 3T_f]$ (hereafter, also notated as measurement time B). (Actually, the time slot B illustrated in FIG. 3 is $[T_f, 2T_f]$).

As is apparent from FIG. 3, aperture synthesis is established, for respective signals received at measurement times A and B, when a phase length of the signal received by the reference receiving antenna $A_{RN}$ at measurement time A matches a phase length of the signal received by the reference receiving antenna $A_{R1}$ at measurement time B.

Each HYB 16 branches the demodulated signal outputted by the A/D converter 15 in the direction of the envelope detector unit 17 and in the direction of the data clipper/phase correction unit 20. The envelope detection units 17 are connected to the respective HYBs 16 in order to process the demodulated signals of the signals received by the reference receiving antenna. The envelope detector units 17 detect envelope components of demodulated signals inputted by the HYBs 16. Hereafter, the envelope components acquired by the envelope detector units 17 may be referred to as "envelope signals".

When the envelope detection units 17 detect, for instance, the existence of a signal component having a period that is longer (frequency lower) than a minimum frequency resolution of a fast Fourier transform (FFT) performed by the signal processing unit 21, the envelope detector units 17 send the acquired envelope signal to an integrated distance calculation unit 19. When the envelope detector units 17 detect the existence of an envelope component having a period longer than the minimum frequency resolution of the Fourier transform, the envelope detector units 17 may ask the transmission cycle setting unit 26 to request, to the CPU 23, probe signal radiation in accordance with the above-described transmission cycle information (P and Q) (the request may include a modification of the values of P, Q, and Tf). The envelope detector units 17 are realized by using, for instance, a diode detector, a quadrature demodulator, a Hilbert transformer, a wavelet transformer, or a filter bank.

In the first embodiment, a Hilbert transformer is used in the envelope detection unit 17. The Hilbert transformer performs a Hilbert transform on signals that comprise only a real component of a complex signal (demodulated signals actually measured are all real numbers), to work out an imaginary component. A complex signal (analytical signal) can be obtained as a result. Thereafter, the Hilbert transformer works out the square root of the sum of the square of the real component and the square of the imaginary component.

If the output of the mixers 14 or the A/D converters 15 is separated into I/Q (in-phase/quadrature) components, the envelope can be easily worked out based on the formula "sqrt[$I^2(t)+Q^2(t)$]" (i.e. square root of $I^2(t)+Q^2(t)$). In this case a Hilbert transform operation is not required. The obtained envelope is subjected, as the case may require, to a smoothing process for the purpose of noise removal. An unwrap process is performed in phase correction during aperture synthesis by the signal processing unit 21.

The data clipper of the data clipper/phase correction unit 20 can receive, from the respective A/D converters 15, the demodulated signals of the signals received by the respective receiving antennas in the respective time slots, and can retain the respective demodulated signals in a memory (that is, the memory may save the output from the A/D converter 15 obtained in the above-described "one period of operation as a device" in an accessible manner for each time slot and each receiving system (antennas to A/D converters). Data from a desired receiving system in a desired time slot may be appropriately outputted in respective below-described operations).

The data clipper conforms to each other the phases of the envelope components of the respective inputted demodulated signals on the basis of a delay amount as transmitted by the integrated distance calculation unit 19. Specifically, the data clipper clips respective signals for a $T_f$ time after the delay amount from each demodulated signal, during [Tf, 3Tf]. As a result, the data clipper 19 can acquire data for which the envelope phase and the respective demodulated signals match each other, during [$0,T_f$], from the respective demodulated signals during, [Tf, 3Tf] (that is, there can be obtained a data string in which the phases of the envelopes are matched to each other, from data strings acquired in dissimilar time slots). The data clipper sends the respective demodulated signals, having thus undergone (envelope) phase correction, to the phase correction unit.

The phase correction unit of the data clipper/phase correction unit 20 receives respective demodulated signals, having aligned phases for the envelope components, as sent by the data clipper (in the specific example used herein, the length of data sent by the data clipper is identical to that in the time slot [$0,T_f$]), and the residual phase error of the demodulated signals is corrected. Specifically, in order to cancel the influence of the residual phase error in the baseband signal, including characteristic variations of the respective circuit elements, there is calculated an amount of correction (in the time domain) by using Expression (2.4) and correction is performed, in accordance with this correction amount, in such a manner that the phase errors of respective demodulated signals at the measurement time [$T_f$, $3T_f$], clipped by the data clipper so that the envelope phases conform to each other, conform in turn to the phase errors of respective demodulated signals at another measurement time [0, $T_f$] (if the data has aligned envelope phases, then time domain data may be subjected to FFT to yield frequency domain data, and the correction amount is calculated according to Expression (1.13), such that the above-described correction process is performed in the frequency domain). The respective signals having a residual phase error thus corrected are sent to the signal processing unit 21.

The signal processing unit 21 subjects the respective signals transmitted from the data clipper/phase correction unit 20 to aperture synthesis, and applies, to the signals having been subjected to aperture synthesis, a known angle estimation algorithm (hereafter, simply angle measurement algorithm), such as, for instance, DBF (Digital Beam Forming), MUSIC (MUltiple SIgnal Classification), PRISM (PRopagator method based on an Improved Spatial-smoothing Matrix) and the like. The signals that have been subjected to aperture synthesis in the time domain may be converted into frequency domain signals by applying a Fourier transform (such as fast Fourier transform (FFT)), and the angle measurement algorithm may be applied to the frequency domain signals. The aperture synthesis method and the angle measurement algorithm may be carried out using a known technique, and hence an explanation thereof will be omitted herein. In the angle measurement algorithm, the signal processing unit 21 may use a correlation matrix that does not include an autocorrelation component.

The signal processing unit 21 may acquire, from the envelope detector units 17, information on frequencies of the envelopes themselves or information on the respective frequencies of the signal components that constitute the envelopes, and may acquire the envelope components (or above-mentioned respective amounts) through a predetermined method. In this case, the signal processing unit 21 may issue an instruction to change the period $T_f$ of the reference signal from the transmission cycle setting unit 26, if the frequency component (or above-mentioned respective amounts) is smaller than a predetermined threshold value.

In a case where a plurality of targets, the distance whereof is to be measured, is present at a same distance and moves with small velocity differences with respect to each other, as in the comparative example, there arises a amplitude modulation (AM) component that has a frequency according to a Doppler frequency difference. Aperture synthesis cannot be performed appropriately by phase correction in the frequency domain if the frequency according to the Doppler frequency difference is smaller than the resolution of the first frequency analysis unit (for instance, FFT) that is used in the signal processing unit (Signal Processing Unit) 21. In some cases, a sufficient aperture synthesis effect failed to be achieved even upon correction in the time domain.

In the first embodiment, a reference path signal is monitored by the envelope detection unit 17. In this monitoring, probe signals are radiated from TX1 (transmitting antenna $A_{T1}$) for a $PT_f$ time, and from TX2 (transmitting antenna $A_{T2}$) for a $QT_f$ time (P,Q∈Z), if there exists an envelope component the period of which is longer than the minimum frequency resolution of the first frequency analysis unit.

The integrated distance calculation unit 19 detects a timing until the envelope phases of respective reference paths corresponding to TX1 and TX2 match each other. Specifically, the integrated distance calculation unit 19 calculates a integrated distance dist(τ) relating to a parameter τ, such that the timing until the envelope phases match each other is detected using the value of the parameter τ at the time where the integrated distance is minimal.

The data clipper of the data clipper/phase correction unit 20 clips, by $T_f$ time, data of the respective receiving antennas (demodulated signals) by the probe signal of TX2, from the above-described timing, taking as a reference the phase of TX1 or TX2 (for instance, TX1). The demodulated signal comprising also the envelope component of the reference path is subjected to phase correction by the phase correction unit.

In a case where the frequency according to the difference of Doppler frequency is small to a degree that precludes obtaining an appropriate aperture synthesis result, even through operation of the integrated distance calculation unit 19 and the data clipper/phase correction unit 20, there is outputted an instruction (control command) of modifying the period $T_f$ itself of the modulation input signal to the RF-VCO, from the transmission cycle setting unit (P/Q) 26 of probe signals. The control command can be outputted, for instance, from the CPU 23 to the transmission cycle setting unit 26. The output source of the control command is not limited to the CPU 23, and the command may be outputted by the data clipper/phase correction unit 20, the signal processing unit 21 or some other control unit. In the example of FIG. 9, the data clipper and the phase correction unit are represented in the same block, but may be realized by a hardware chip dissimilar from the foregoing.

Alternatively, there may be outputted a control signal for increasing at least one value from among P and Q. Increasing at least one from among P and Q requires an observation time that is proportional to the inverse of a minimum difference frequency. Therefore, a specific value is set in accordance with the travel environment of the vehicle (moving body) installed in the radar device 1A. The value of P and Q is deemed to increase dramatically, in particular, at congested sites such as tolls and intersections. An output trigger of the control command may be a manual operation by the user of the radar device 1A, or a sensor that senses the travel environment and that is installed in a vehicle (moving body) (for instance, motion velocity detected by a speedometer provided in the vehicle body on which the radar is installed, or an infrastructure-based environment information providing device such as a GPS, DSRC or the like).

Figure 11:
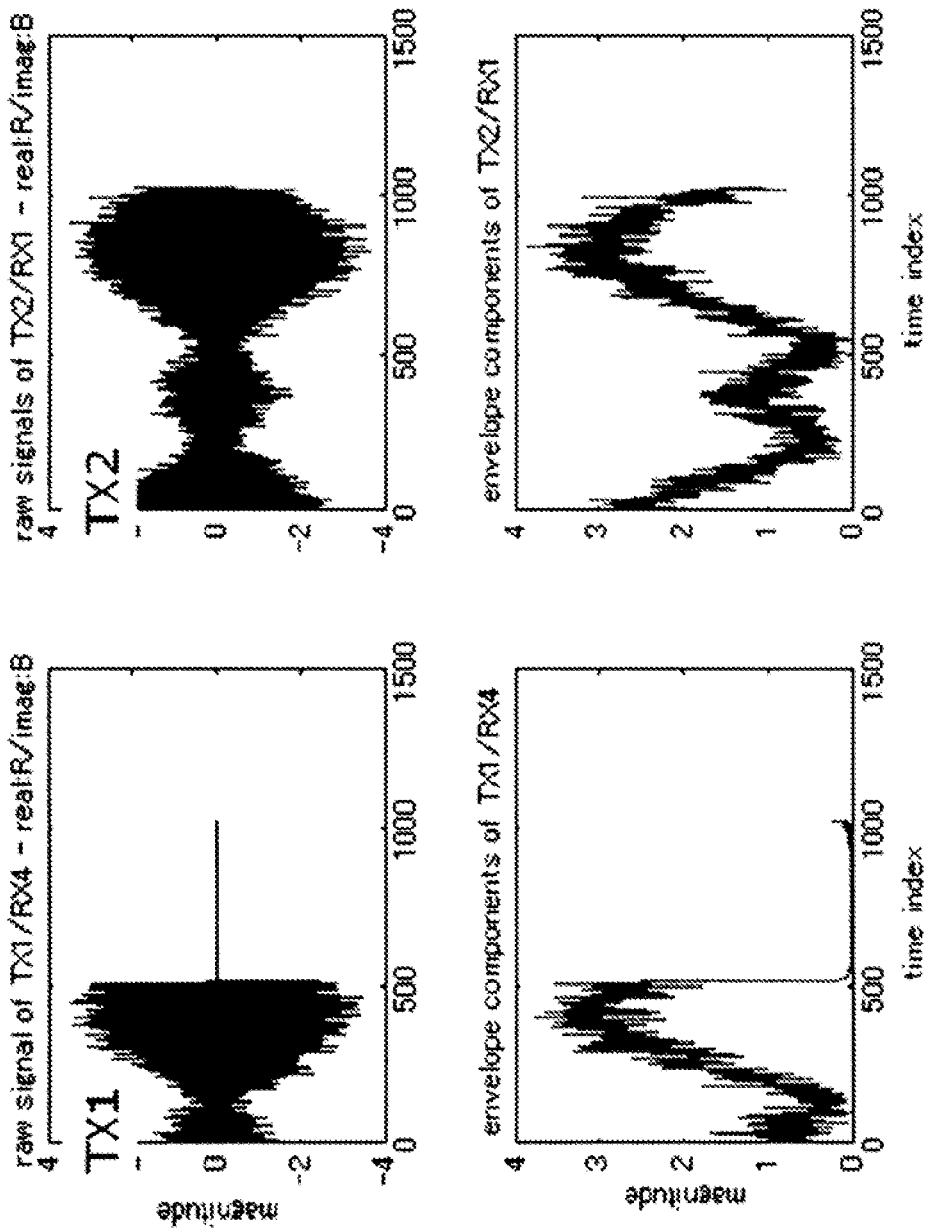
FIG. 11 is a set of graphs illustrating echo signals, and envelopes thereof, of reference paths acquired by the radar device illustrated in FIG. 9.

FIG. 11 illustrates an instance where there are three targets to be detected, the various specifications of the targets $T_1$, $T_2$, $T_3$ being $T_1$(40 (m), 0 (deg), 10 (km/h)), $T_2$(40 (m), 3 (deg), 11 (km/h)), $T_3$(40 (m), 6 (deg), 12 (km/h)), signal to noise ratio (SNR)=30 (dB). FIG. 11 depicts echo signals, and envelopes thereof, of each reference path at a time where the radar device 1A of FIG. 9 is operating in accordance with the timing chart of FIG. 10. The left side of FIG. 11 illustrates an echo signal (demodulated signal) (top) and an envelope (bottom) of a reference path for the transmitting antenna TX1. The right side of FIG. 11 illustrates an echo signal (demodulated signal) (top) and an envelope (bottom) of a reference path for the transmitting antenna TX2. For the sake of a simpler calculation, zero padding is performed on the echo signal of the reference path for TX1, in the example of FIG. 11, and there is matched the data length of the echo signals of the reference paths for TX2.

Figure 12:
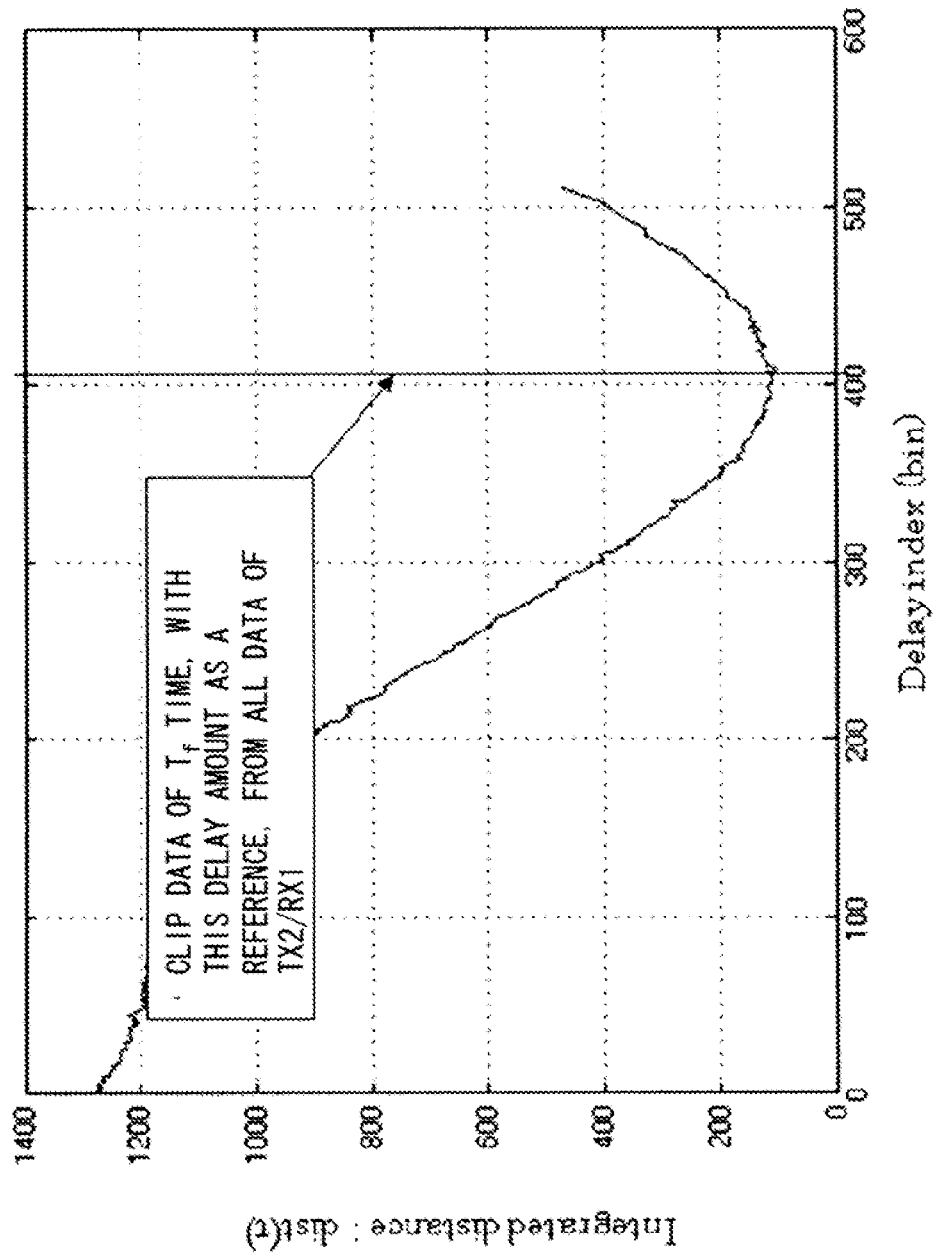
FIG. 12 is a graph illustrating an example of obtaining, on the basis of an integrated distance, a timing at which the phases of the envelopes illustrated in FIG. 11 match each other.

FIG. 12 is an example of calculation of timing at which the envelope phases illustrated in FIG. 11 match each other, on the basis of a minimum value of the integrated distances of envelopes $v^{TX1,env}_{RX,N}(t)$, $v^{TX2,env}_{RX,1}(t)$ of the demodulated signals of the reference paths (in the calculation examples of the integrated distance hereafter, the timings are illustrated as values before execution of an averaging operation). The integrated distance $dist(\tau)$ is given by Expression (3.1a). Calculation of the $dist(\tau)$ is performed by the integrated distance calculation unit 19 illustrated in FIG. 9. Expression (3.1b) may be used instead of Expression (3.1a) in a case where a time slot used for the purpose of, for instance, saving memory, is limited to one interval of $[0, T_f]$.

[Expression 16]

$$dist(\tau) = \begin{cases} \dfrac{1}{PT_f}\displaystyle\int_0^{PT_f}[v^{TX1,env}_{RX,N}(t) - v^{TX2,env}_{RX,1}(t + PT_f + \tau)]^2\, dt, & \tau \in [0, (Q-P)T_f], \text{ for } P < Q \\ \dfrac{1}{QT_f}\displaystyle\int_0^{QT_f}[v^{TX1,env}_{RX,N}(t) - v^{TX2,env}_{RX,1}(t + QT_f + \tau)]^2\, dt, & \tau \in [0, (P-Q)T_f], \text{ for } P > Q \end{cases} \quad (3.1a)$$

$$dist(\tau) = \begin{cases} \dfrac{1}{T_f}\displaystyle\int_t^{t+T_f}[v^{TX1,env}_{RX,N}(t) - v^{TX2,env}_{RX,1}(t + PT_f)]^2\, dt, & \text{for } P < Q, 0 \le \tau \le (P-1)T_f \\ \dfrac{1}{T_f}\displaystyle\int_t^{t+T_f}[v^{TX1,env}_{RX,N}(t) - v^{TX2,env}_{RX,1}(t + PT_f)]^2\, dt, & \text{for } P > Q, 0 \le \tau \le (Q-1)T_f \end{cases} \quad (3.1b)$$

The essence of the embodiment of the invention is taking the envelopes $v^{TX1,env}_{RX,N}(t)$, $v^{TX2,env}_{RX,1}(t)$ of the demodulated signals as time functions, and finding thereupon a time interval for which there is minimized the distance between these two functions. As a result, the occupancy time of the time slots, various case analyses according to the sequence of the time slots, and/or accessory operations (for instance, setting of integration intervals, an operation (addition PTf or QTf) of matching time intervals in $v^{TX1,env}_{RX,N}(t)$, $v^{TX2,env}_{RX,1}(t)$ upon distance calculation), or an averaging operation or the like (division by the width of integration intervals)) need only be decided appropriately depending on the way in which Expression (3.1a) is to be implemented in the device. In a case where P≠Q, the computation itself of the integrated distance need only be a single expression for working out the integrated distance between ordinary functions, if insufficient data are complemented by zero padding.

Figure 13:
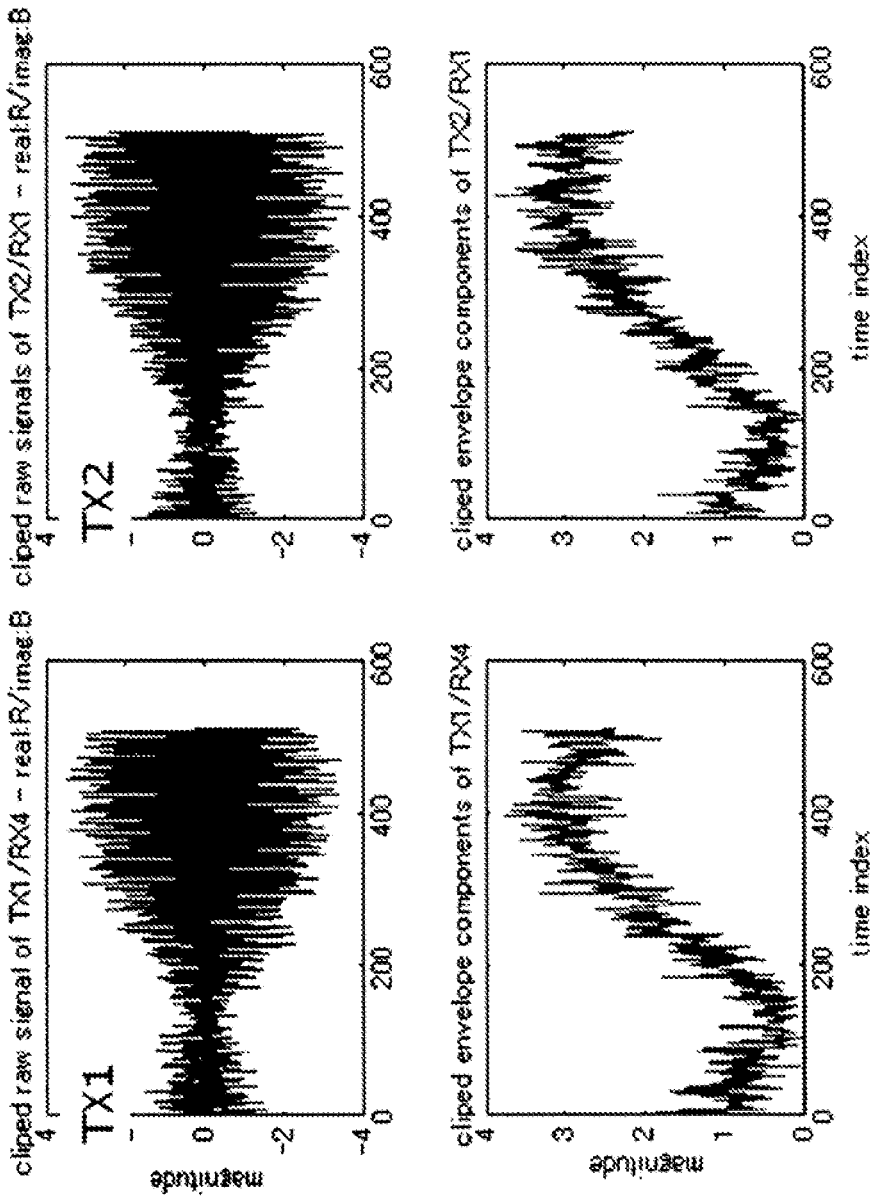
FIG. 13 illustrates data after alignment of phases of envelopes clipped on the basis of the timing illustrated in FIG. 12.

FIG. 13 illustrates a graph (right side) in which an interval corresponding to Lag+$[0, T_f]$ is clipped from data (demodulated signals and envelopes) over the entire interval of the signal $v^{TX2}_{RX,1}(t)$ illustrated in FIG. 11, on the basis of the timing (Lag) detected in FIG. 12, and illustrates a graph (left side) of a demodulated signal $v^{TX1}_{RX,N}(t)$ and an envelope at $[0, T_f]$. As illustrated in FIG. 13, there is obtained data (signal) in which the envelope phases are aligned. The operation of aligning such phases is carried out by the data clipper in the data clipper/phase correction unit 20 illustrated in FIG. 9.

Figure 14:
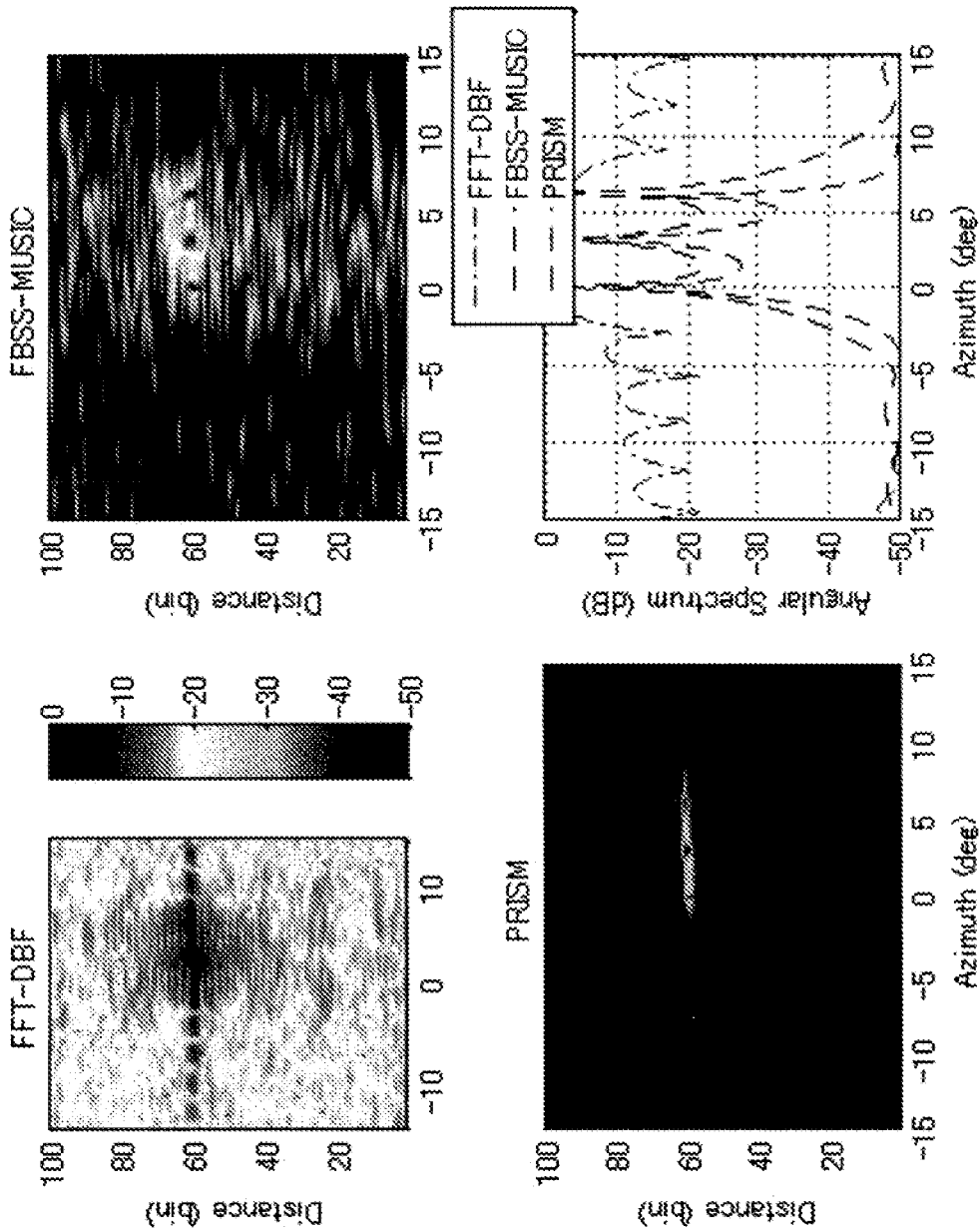
FIG. 14 illustrates an example in which there is realized aperture synthesis of signals through execution of phase correction, followed thereafter by FFT, and by angle measuring in the frequency domain.
Figure 15:
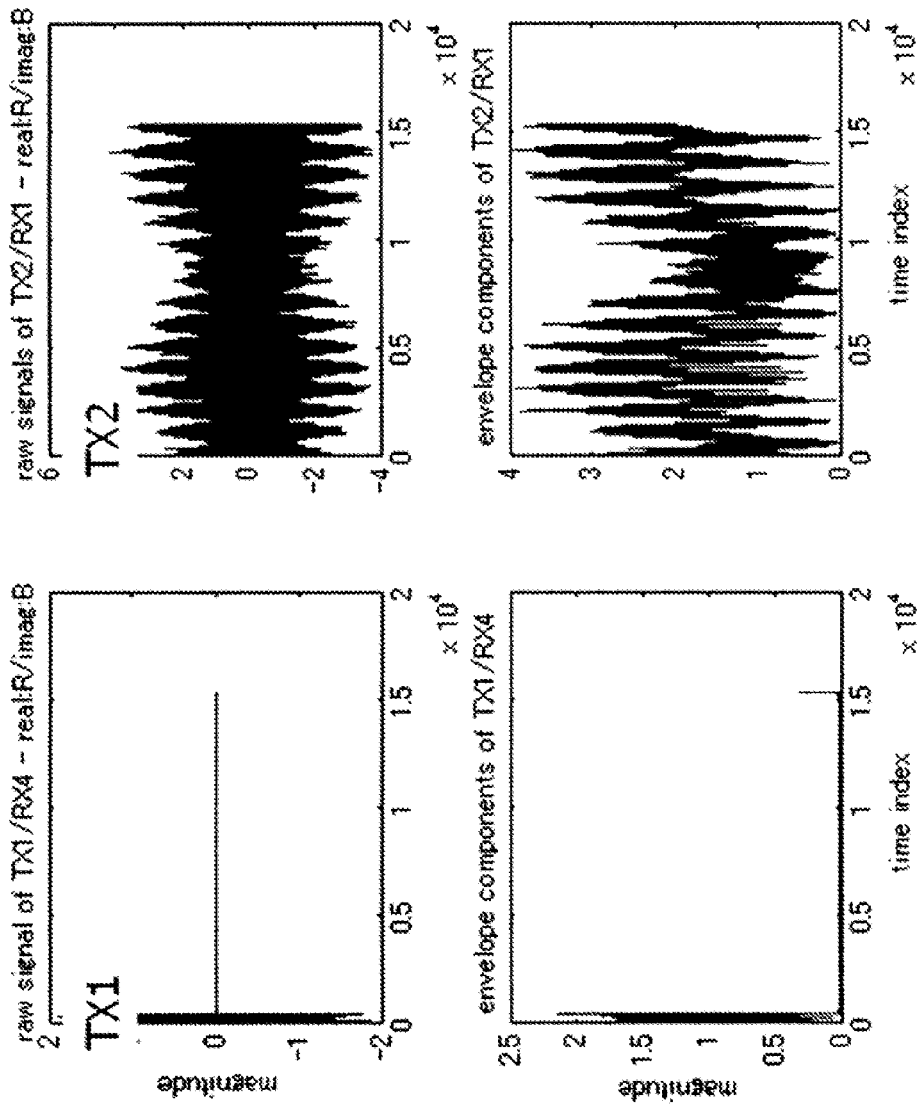
FIG. 15 is a set of graphs illustrating another example of echo signals, and envelopes thereof, of reference paths acquired by the radar device illustrated in FIG. 9.
Figure 16:
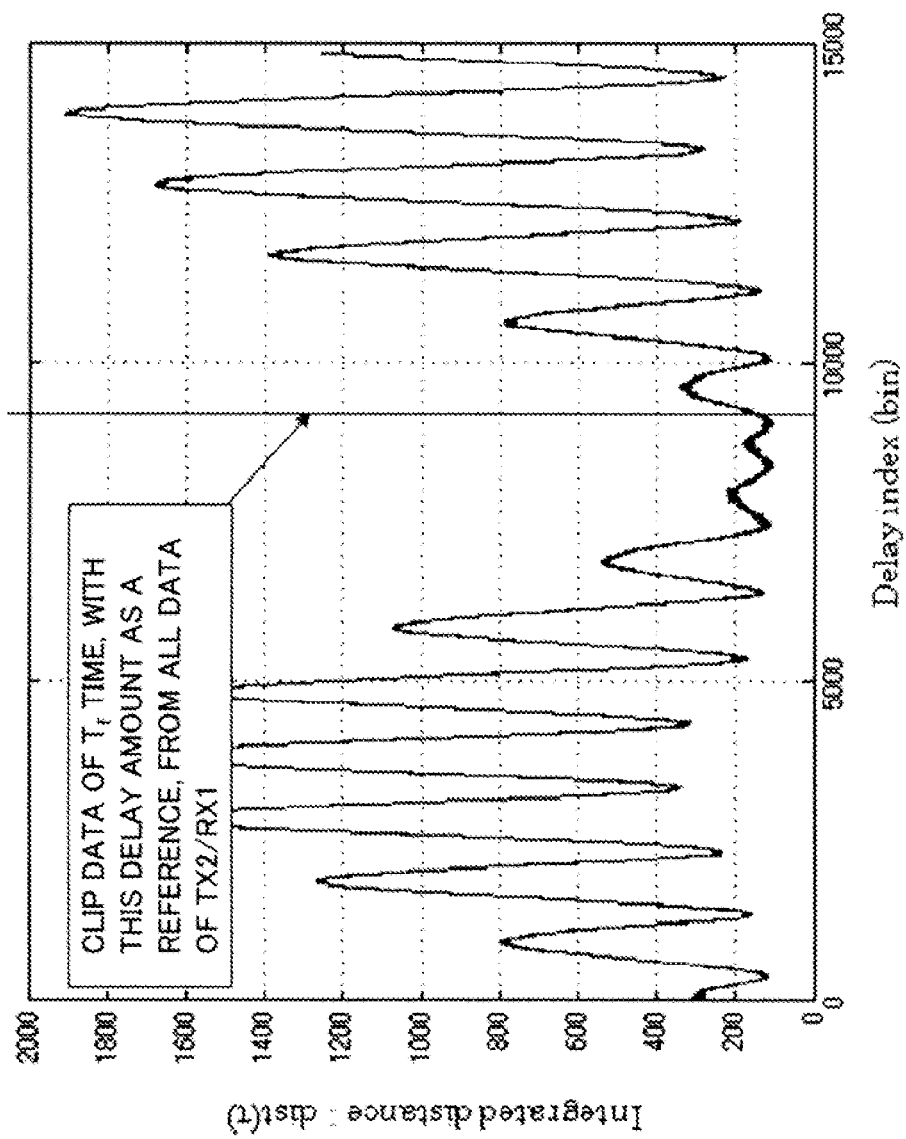
FIG. 16 is a set of graphs illustrating an example of obtaining, on the basis of an integrated distance, a timing at which the phases of the envelopes illustrated in FIG. 15 match each other.
Figure 17:
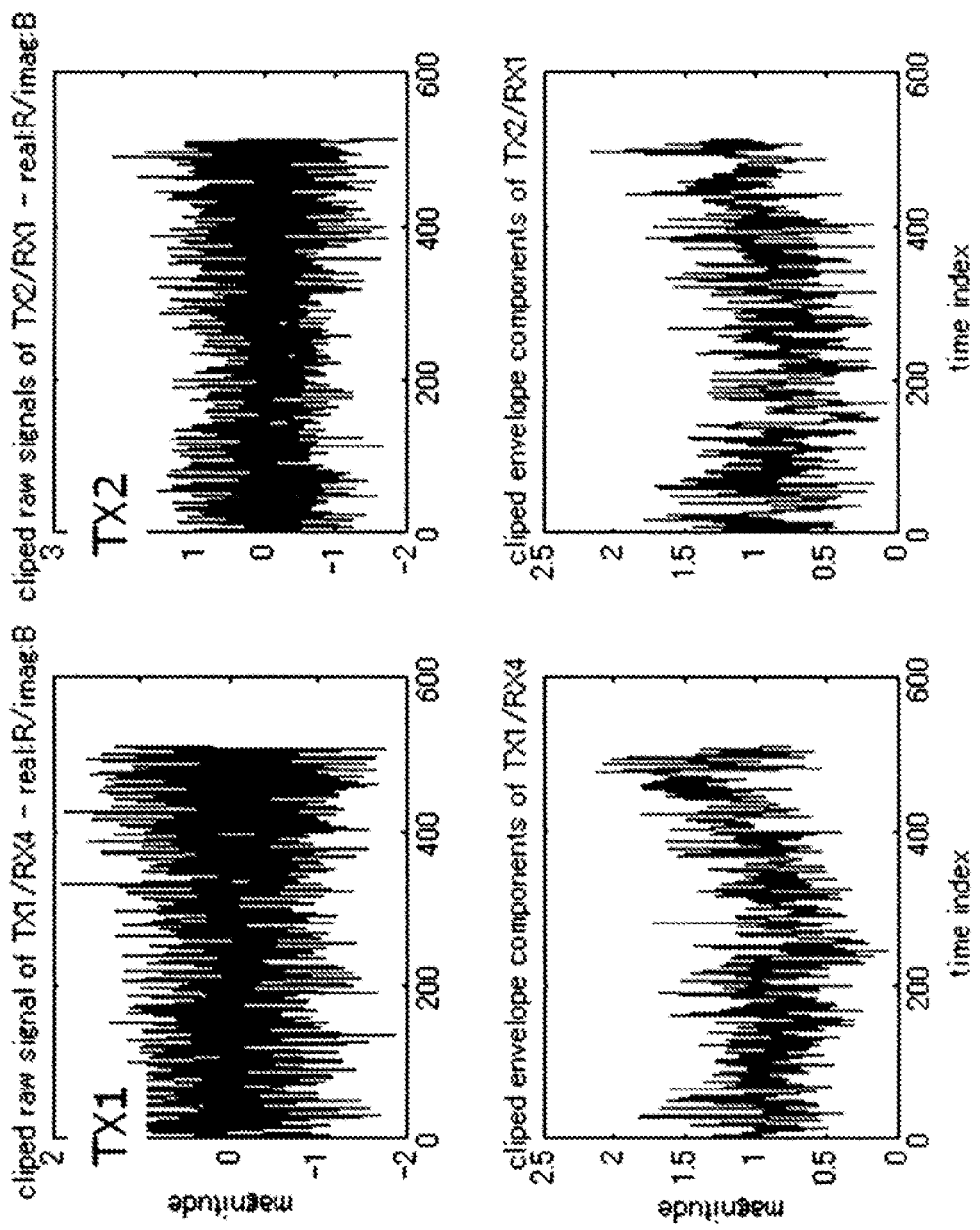
FIG. 17 illustrates data after alignment of phases of envelopes clipped on the basis of the timing illustrated in FIG. 16.
Figure 18:
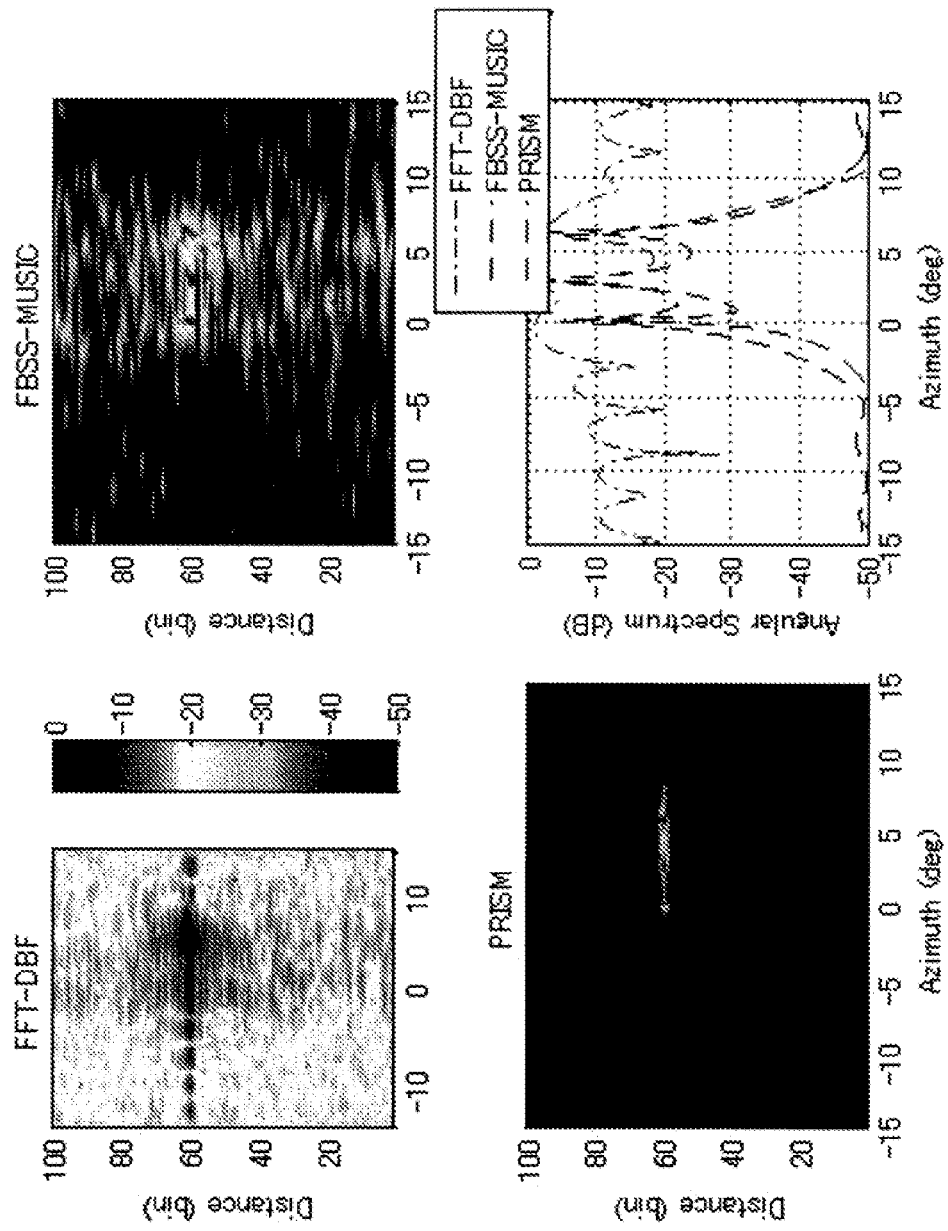
FIG. 18 illustrates an example in which there is realized aperture synthesis of signals through execution of phase correction, followed thereafter by FFT, and by angle measuring in the frequency domain.

FIG. 14 illustrates the results arrived upon subjecting the demodulated signal $v^{TX2}_{RX,n}(t)$ to phase correction in the phase correction unit of the data clipper/phase correction unit 20 of FIG. 9, using the signals of the reference paths illustrated in FIG. 13, performing aperture synthesis (with demodulated signal $v^{TX1}_{RX,n}(t)$) in the signal processing unit 21, performing FFT on the synthesized signals, and performing angle measuring in the frequency domain. Phase correction is executed on the basis of Expression (2.4). As illustrated in FIG. 14, it is found that an appropriate estimation can be realized through a combination of MUSIC or PRISM, being known super-resolution angle measuring methods, and a phase correction method that uses a timing at which the phases of the envelopes of the reference path signals match each other, as described above.

FIG. 15 to FIG. 18 illustrate other calculation examples in which the above-described phase correction method is utilized. In these other calculation examples, the various target data items are $T_1$(40 (m), 0 (deg), 10 (km/h)), $T_2$(40 (m), 3 (deg), 10.1 (km/h)), $T_3$(40 (m), 6 (deg), 11 (km/h)), SNR=30 (dB). The P,Q values in the radar device 1A are set to P=1, Q=30. The radar device 1A was operated according to the timing chart illustrated in FIG. 10.

The phase correction method in the radar device 1A has proved effective even for small perturbations, namely minimum value of relative velocity difference of merely 0.1 (km/h)=0.028 (m/sec), i.e. distances of merely 0.11 mm to a target, at each period $T_f$. Distance fluctuations are difficult to measure even using a direct sequence spread spectrum-type radar (specifically, only distances of about 10 cm can be detected at a occupied bandwidth of about 1 GHz). This shows that measurement of small distances, which is difficult even in ultra-wideband detection and ranging apparatuses, is afforded by the radar device of the embodiment.

The phase correction method described above is also applicable to instances where there exists a plurality of targets to be detected having close relative velocities at a plurality of distances. The underlying reasons are as follows. For instance, the may be, hypothetically, a target $T_1(r^1, \theta^1, v^1)$, and a target $T_2(r^1, \theta^2, v^2)$ at a distance $r^1$, plus a target $T_3(r^2, \theta^3, v^3)$ and a target $T_4(r^2, \theta^4, v^4)$ at distance $r^2$.

The frequency determined by the distance $r^1$ of the targets $T_1, T_2$ can be defined as $\omega_B^1 \cong \omega_B^2 \cong \omega_B^1$. The frequency defined by the distance $r^2$ of the targets $T_3, T_4$ can be defined as $\omega_B^3 \cong \omega_B^4 \cong \omega_B^3$. Thus, defining for instance the spatial phase determined by the angle of each target as $\phi_n^{TX1/2,m}$, and defining the Doppler frequency determined by the velocity as $\omega_c \mu^m$ (m=1 to 4), then the baseband signal that is obtained through reception, at the n-th receiving antenna, of a probe signal from TX1, can be represented in accordance with Expression (3.2) (for simplicity, there appears only a one-side TX).

[Expression 17]

$$v_{RX,n}^{TX1}(t) = \exp[j\Delta\psi^{TX1}(t)]\left\{\exp(j\omega_B^1 t)\sum_{m=1}^{2}\exp[j(\omega_c\mu^m t + \phi_n^{TX1,m})] + \exp(j\omega_B^3 t)\times\sum_{m=3}^{4}\exp[j(\omega_c\mu^m t + \phi_n^{TX1,m})]\right\} + n_n^{TX1}(t) \quad (3.2)$$

The spatial phase is time-invariant, and hence, for a better comprehension, a vector $\mu$, a vector $\phi$, and a synthetic envelope $A(t:\mu,\phi)$ are represented as in Expressions (3.3a), (3.3b) and (3.3c). Also, the spatial phase is also expressed as in Expressions (3.4a) and (3.4b), focusing on time-varying terms.

[Expression 18]

$$\mu \equiv [\mu^1, \mu^2, \mu^3, \mu^4] \quad (3.3a)$$

$$\phi \equiv [\phi_n^1, \phi_n^2, \phi_n^3, \phi_n^4] \quad (3.3b)$$

$$A(t:\mu,\phi) \equiv \quad (3.3c)$$

$$\sqrt{\left|\sum_{m=1}^{2}\exp[j(\omega_c\mu^m t + \phi_n^{TX1,m})]\right|^2 + \left|\sum_{m=3}^{4}\exp[j(\omega_c\mu^m t + \phi_n^{TX1,m})]\right|^2}$$

$$\exp(j\alpha_1 t) \equiv \frac{\sum_{m=1}^{2}\exp[j(\omega_c\mu^m t + \phi_n^{TX1,m})]}{A(t:\mu,\phi)} \quad (3.4a)$$

$$\exp(j\alpha_3 t) \equiv \frac{\sum_{m=3}^{4}\exp[j(\omega_c\mu^m t + \phi_n^{TX1,m})]}{A(t:\mu,\phi)} \quad (3.4b)$$

Expression (3.2) can thereupon be rewritten as Expression (3.5) next.

[Expression 19]

$$v_{RX,n}^{TX1}(t) = \quad (3.5)$$
$$\exp[j\Delta\psi^{TX1}(t)]A(t:\mu,\phi)\{\exp[j(\omega_B^1 + \alpha_1)t] + \exp[j(\omega_B^3 + \alpha_3)t]\} +$$
$$n_n^{TX1}(t) = \exp[j\Delta\psi^{TX1(t)}]2A(t:\mu,\phi)\exp\left[j\frac{(\omega_B^1 + \alpha_1 - \omega_B^3 - \alpha_3)t}{2}\right]$$
$$\cos\left[\frac{(\omega_B^1 + \alpha_1 + \omega_B^3 + \alpha_3)t}{2}\right] + n_n^{TX1}(t)$$

That is, the echo signal that is obtained from each receiving antenna for the probe signal from TX1, including a reference path signal, constitutes a signal that results from modulation, by the synthetic envelope $A(t:\mu,\phi)$, of a synthesis baseband signal having a frequency $(\omega_B^1+\alpha_1+\omega_B^3+\alpha_3)/2$.

Figure 19:
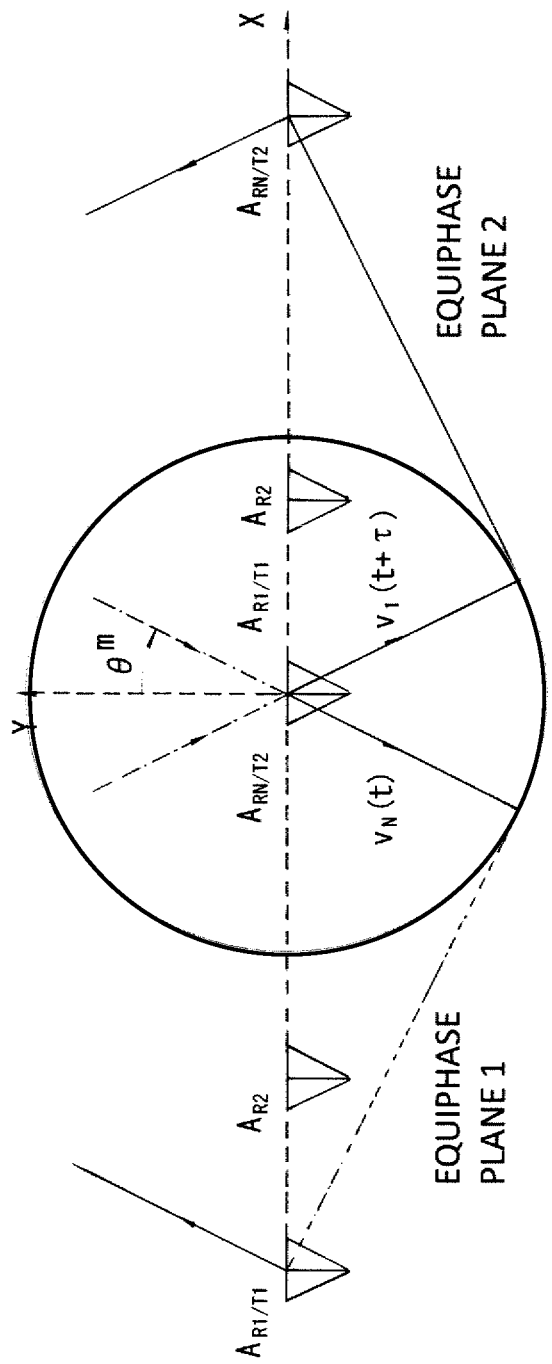
FIG. 19 is a diagram for explaining phase correction on a synthetic envelope.

FIG. 19 is a diagram for illustrating schematically the foregoing mathematical explanation, wherein the figure illustrates a relationship between an equiphase plane (equiphase wave surface) of an echo signal from a target obtained through transmission of a probe signal from TX1 at a given time slot, and an equiphase plane of an echo signal from a target obtained through transmission of a probe signal from TX2 at a different time slot, in the form of a relationship vis-à-vis the reference path.

Thus, the equiphase planes of echo signals at two time slots can be regarded as being such that a phase relationship, where the synthetic envelopes are the respective radii, rotates with time (as FIG. 19 shows, the trajectory of respective synthetic envelopes in polar coordinates is ordinarily not a perfect circle or ellipse. However, there exists necessarily a time band for which the phases of the reference paths measured between dissimilar time slots are aligned, unless the number of targets and/or the parameters thereof vary abruptly. In cases where this assumption does not hold, then for instance all process prior to angle estimation, including spatial averaging, are ineffective). There are two approaches for the synthesis of the two equiphase planes. In a first approach, there is searched a delay time for which the inner product of the reference path signals is maximal. In a second approach, there is searched a delay time for which the difference between reference path signals is minimal. The phase correction method in the first embodiment relies on the latter approach.

In the latter approach, the signals $v^{TX1,env}_{RX,N}(t)$, $v^{TX2,env}_{RX,1}(t)$ of the reference paths are acquired at dissimilar time slots, in Expression (3.1a) that gives an integrated distance.

Therefore, the residual components after matching of the signal phases become noise components uncorrelated with each other. That is, the integrated distance at a time where the phases of the reference paths match each other becomes identical to that of noise power. As a threshold value for determining phase synthesis of the reference paths there can be used, accordingly, a quantitative criterion, namely a criterion of whether or not the integrated distance is substantially identical to that of noise power at a time of no signal.

Figure 20:
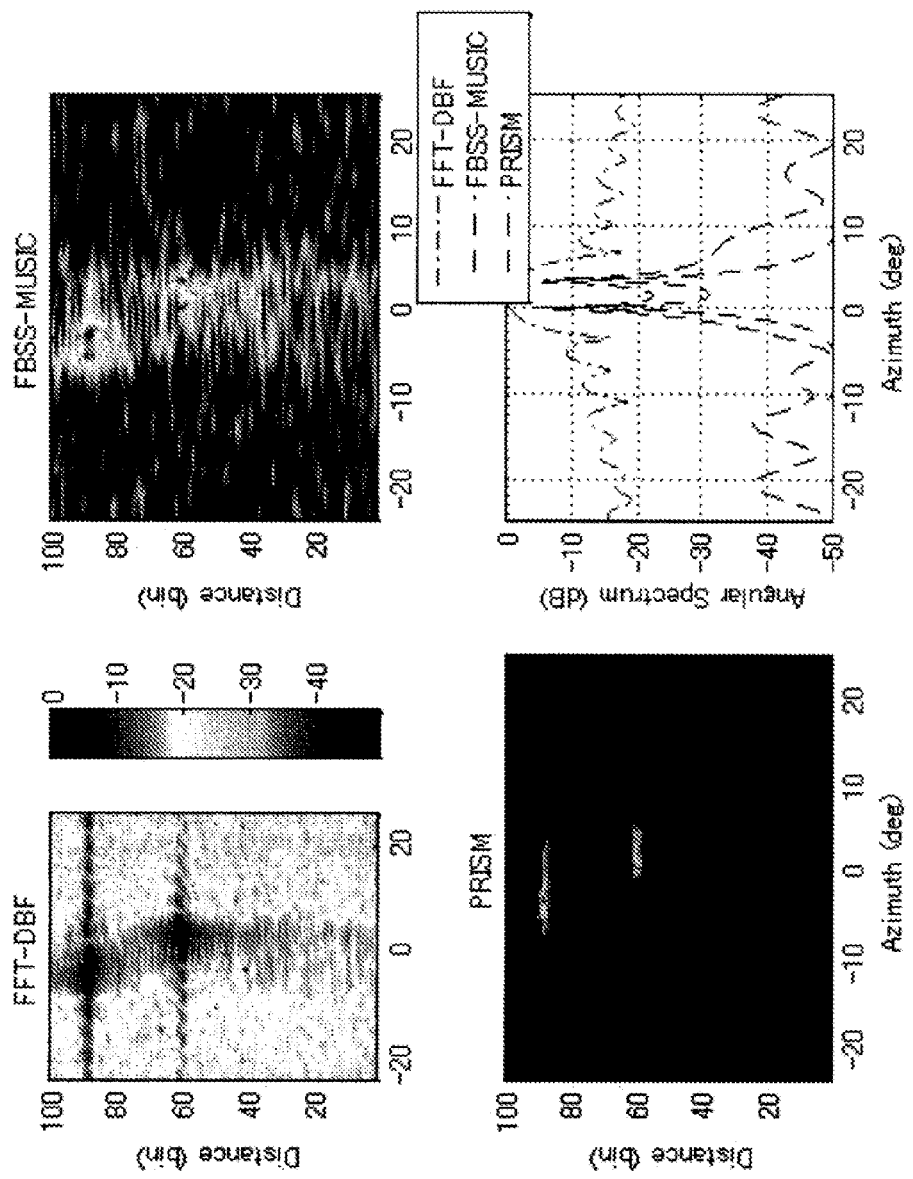
FIG. 20 is a set of diagrams illustrating measurement results in a case where a plurality of targets having similar relative velocities is present at a plurality of distances.

FIG. 20 is a calculation example for demonstrating that the aperture synthesis is established in a situation as illustrated in another calculation example. Hypothetical conditions include herein targets $T_1$(0 (deg), 10 (km/h)), $T_2$(3 (deg), 11 (km/h)) at a distance of 40m, and targets $T_3$ (−3 (deg), 12 (km/h)), $T_4$(−6 (deg), 13 (km/h)) at a distance of 60m. FIG. 20 clearly shows that aperture synthesis is established for the four targets.

In the radar device 1A according to the first embodiment the phases of data (signals) for which aperture synthesis is established at respective measurement times are aligned on the basis of envelope information of reference paths that correspond to TX1 and TX2; as a result, this allows realizing a detection and ranging apparatus that is small and is provided with multiple small sensors, where the number of effective reception sensors is increased under arbitrary conditions. Therefore, the radar device 1A according to the first embodiment affords angle estimation performance, with good precision, for a greater number of targets that can be separated by the actual number of reception sensors.

The radar device 1A of the first embodiment allows establishing aperture synthesis using a simple circuit. However, processing for each frequency is desirable with a view to increasing the response speed of the radar device.

Second Embodiment

Figure 21:
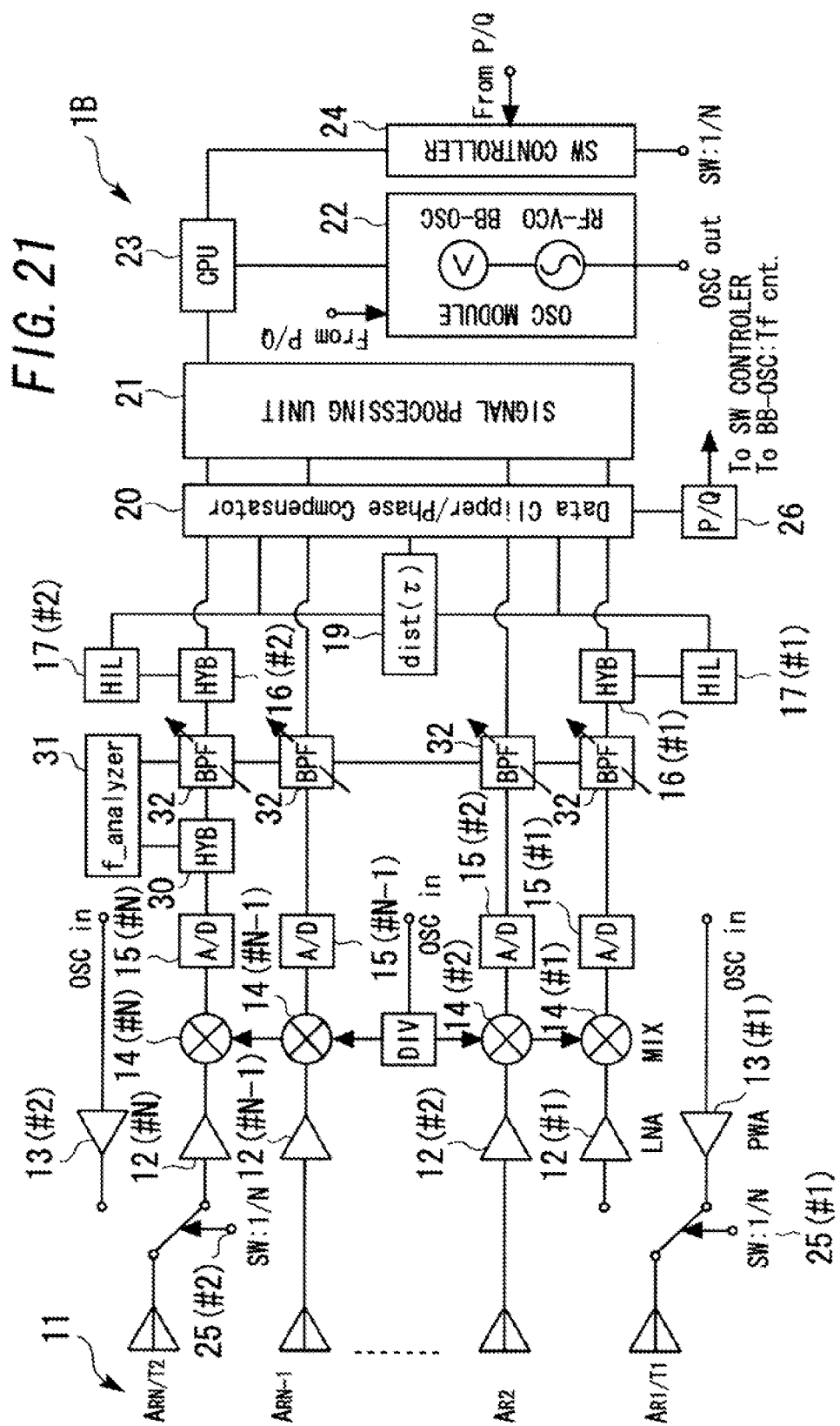
FIG. 21 is a diagram illustrating a configuration example of a radar device in a second embodiment.

FIG. 21 is a diagram illustrating a detection and ranging apparatus (radar device 1B) according to a second embodiment of the present invention. The second embodiment has features in common with those of the radar device 1A (FIG. 9) according to the first embodiment. Hence, the explanation will deal mainly with differences, and an explanation of the common features will be omitted.

The radar device 1B differs significantly from the radar device 1A as regards the features below. (1) A branching unit (HYB) 30 is disposed before the envelope detection unit 17 (17 (#2) in FIG. 21) of at least one reference path, the branching unit 30 being connected to a frequency analysis unit (f_analyzer) 31 that is a second frequency analysis unit. (2) BPFs (Band Pass Filters) 32 of variable central frequency are disposed on a baseband signal route corresponding to a respective receiving antenna. Specifically, each BPF 32 is disposed between an A/D converter 15 and a HYB 16, or between an A/D converter 15 and the data clipper/phase correction unit 20.

In the radar device 1B, a frequency analysis unit 31 performs a Fourier transform on a demodulated signal of a reception signal in a reference path (in FIG. 21, demodulated signal of the receiving antenna $A_{RN}$). The frequency analysis unit 31 analyzes the frequency that makes up the baseband signal (demodulated signal), and, on the basis of the analysis result, controls the central frequency of the BPFs 32 that correspond to N receiving antennas. The envelope detection unit 17 performs envelope detection on the reception signal (demodulated signal), of each reference path, split into bands by the BPFs 32. The integrated distance calculation unit 19 works out an integrated distance between envelopes, and works out a phase correction amount between reference paths, for each band, from a delay amount (τ) that yields a minimum distance value. The data clipper/phase correction unit 20 aligns the phases of all reception signals of the signals in the band, which includes the envelope, using the phase correction amount, and an aperture synthesis function is realized in the processing unit 21.

In a case where the processing system of the BPFs 32 is one for each of the N receiving antennas, it is necessary to work out the delay amount (τ) and to repeat the aperture synthesis operation split band by split band. Accordingly, the combination of frequency analysis unit 31 and central frequency-variable BPFs 32 can be replaced by a filter bank.

Third Embodiment

Figure 22:
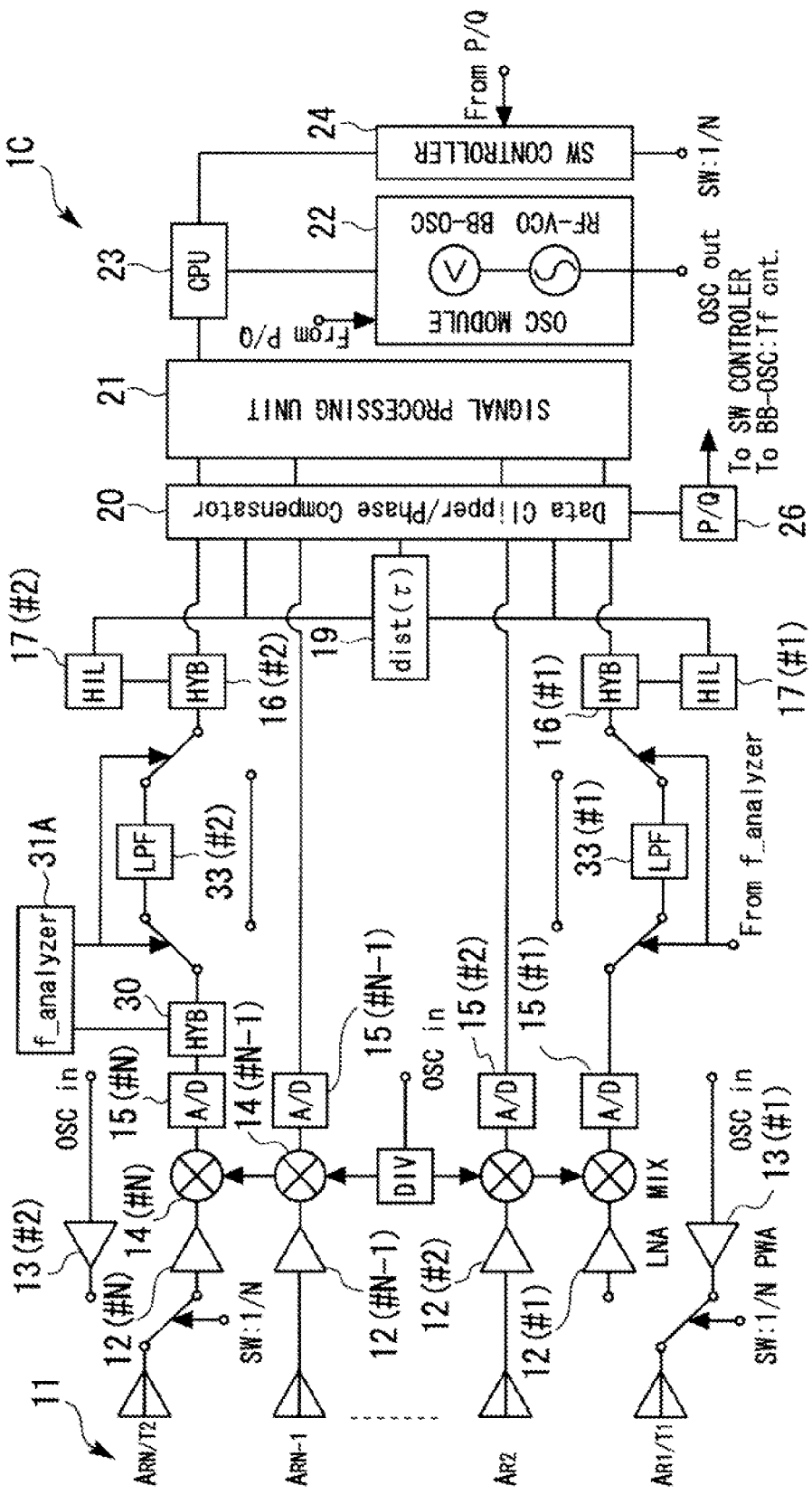
FIG. 22 is a diagram illustrating a configuration example of a radar device in a third embodiment.

FIG. 22 is a diagram illustrating a detection and ranging apparatus (radar device 1C) according to a third embodiment of the invention. The third embodiment has features in common with those of the radar device 1A (FIG. 9) according to the first and second embodiments. Hence, the explanation will deal with mainly with differences, and an explanation of the common features will be omitted.

The radar device 1C differs significantly from the radar device 1A (FIG. 9) as regards the features below. (1) As in the case of the radar device 1C, a branching unit (HYB) 30 is disposed before the envelope detection unit 17 (17 (#2) in FIG. 22) of at least one reference path, the branching unit (HYB) 30 being connected to a frequency analysis unit (f_analyzer) 31A that is a second frequency analysis unit. (2) A pathway is disposed through which signals from respective reference paths is routed to the HYBs 16 and the envelope detection units 17, byway of a LPF (Low Pass Filter) 32 or byway of a through-line.

The operation of the radar device 1C is as follows. Specifically, frequency components of a demodulated signal (demodulated signal of the receiving antenna $A_{RN}$ in FIG. 22) of the reception signal of the reference path is analyzed by the frequency analysis unit 31A. The frequency analysis unit 31A controls switches that are provided at both ends of the LPFs 33 and a through-line, to bring the switches to a state where the demodulated signal of the reference path is inputted to the LPFs 33, in a case where the frequency analysis results include a frequency component equal to or smaller than a minimum resolution of the first frequency analysis unit in the signal processing unit 21 for working out distance and velocity on the basis of demodulated signals (baseband signals). If the frequency analysis result does not comprise above mentioned frequency component, the frequency analysis unit 31A is brought to a state where the demodulated signals traverse the through-line.

The processes that are performed thenceforth on the reference-path demodulated signals that pass through the LPF 33 or the through-line are identical to those of the first embodiment. The cutoff frequency of each LPF 33 is set to a frequency equal to or smaller than the minimum resolution of the first frequency analysis unit. If the frequency analysis unit 31A does not detect a signal component equal to or smaller than a minimum resolution of the first frequency analysis unit, the frequency analysis unit 31A sends the signals of each reference path, without modification, to the envelope detector 17, and not by way of the LPFs 33. The frequency analysis unit 31A controls thus a signal route switching operation. In a case where a signal is supplied from a through-line, therefore, aperture synthesis can be performed, in the embodiment, in the time domain using an envelope, or in the frequency domain using a Fourier transform, as in the comparative example.

Fourth Embodiment

An explanation follows next on a detection and ranging apparatus (radar device 1D) according to a fourth embodiment of the present invention. The fourth embodiment has features in common with those of the radar device 1A (FIG. 9) according to the first embodiment. Hence, the explanation will deal with mainly with differences, and an explanation of the common features will be omitted.

To make drawings more compact in the first to third embodiments, specific examples of devices have been used having a configuration wherein one transmission/reception shared antenna (sensor) is disposed at each outermost edge of the array antenna, and reception-only antennas (sensors) are disposed at the space flanked by the two transmission/reception shared antennas (sensors) at the outermost edges. The number of transmission/reception (or transmission and reception) sensors (antennas), however, can be appropriately set as the case may require. The arrangement of the transmission sensors need not be shared by the reception sensors (receiving antennas). The sensors may be arranged at mutually dissimilar positions in space.

Figure 23:
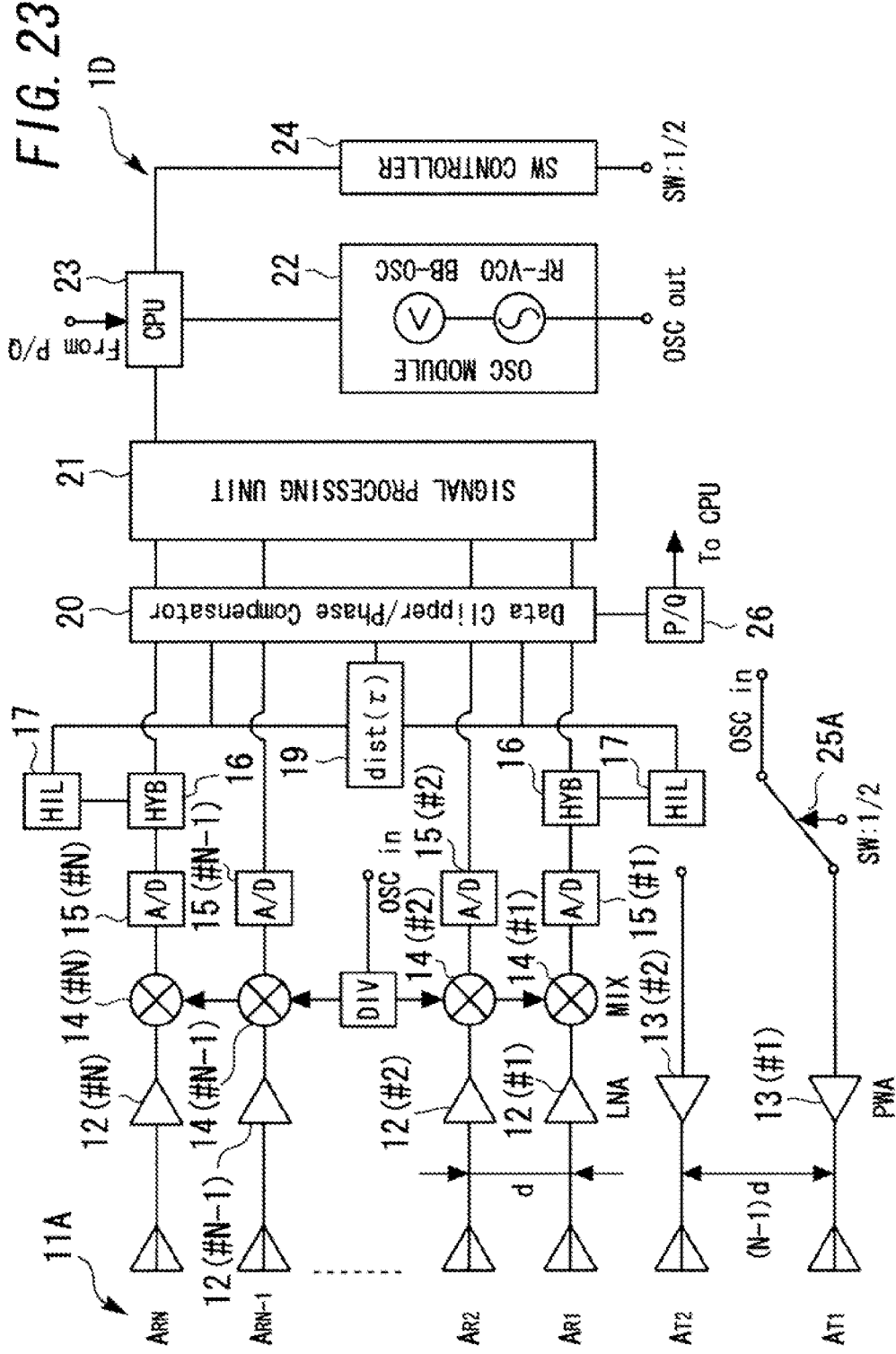
FIG. 23 is a diagram illustrating a configuration example of a radar device in a fourth embodiment.
Figure 24:
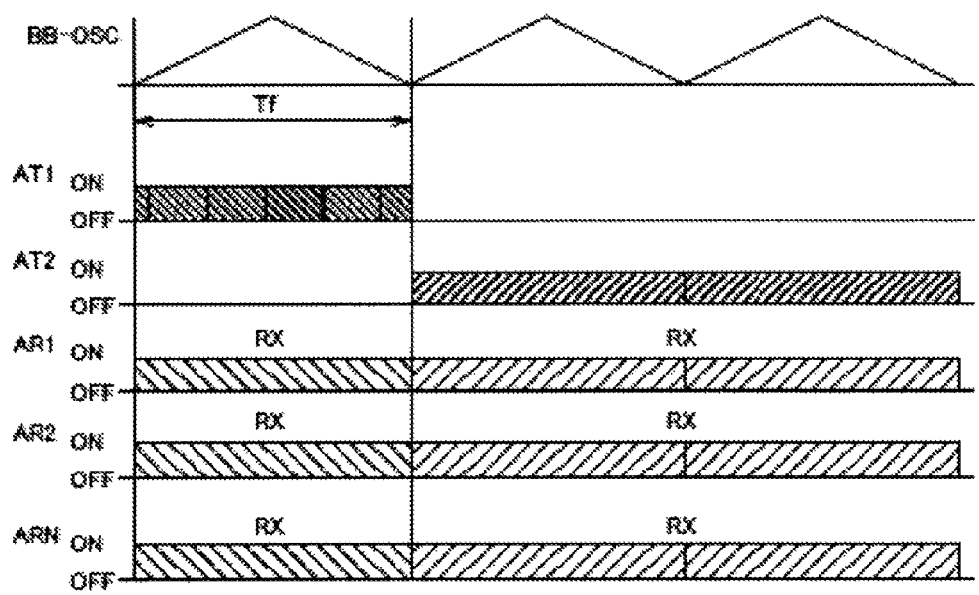
FIG. 24 is a timing chart of the fourth embodiment.

FIG. 23 is a diagram illustrating a configuration example of a detection and ranging apparatus (radar device 1D) according to a fourth embodiment. FIG. 24 is a timing chart of the radar device 1D of FIG. 23. The radar device 1D illustrated in FIG. 23 is provided with transmission-only transmitting antennas $A_{T1}$, $A_{T2}$ and reception-only receiving antennas $A_{R1}$ through $A_{RN}$, instead of the shared antennas of the radar device 1A (FIG. 9).

That is, the radar device 1D has an array antenna 11A that comprises receiving antennas $A_{R1}$ through $A_{RN}$, used only for reception, and transmitting antennas $A_{T1}$ and $A_{T2}$ used only for transmission.

The PWAs 13 are connected to respective transmitting antennas $A_{T1}$, $A_{T2}$, such that a system reference signal from the OSC module 22 is inputted, through switches 25A, to one of the input ends of each PWA 13. The switch controller 24 performs switching control of the switches 25A. Providing dedicated transmitting antennas instead of transmission/reception shared antennas is disadvantageous in terms of device dimensions, but can be expected to afford better performance in terms of reception signal gain (FIG. 24).

In the fourth embodiment, there is set a spacing (N−1)×d between respective transmitting antennas, wherein d is the spacing between respective receiving antennas. As a result, a reference combination is made up of, for instance, the transmitting antenna $A_{T1}$ and the receiving antenna $A_{R1}$, plus a combination of the transmitting antenna $A_{T2}$ and the receiving antenna $A_{RN}$.

The transmitting antennas can be arranged thus at different spatial positions from those of the receiving antennas. The sensor spacing (spacing between antennas: distance d in FIG. 23) need not be an equal spacing. Except for the features above, the effects elicited by the fourth embodiment are identical to those of the first embodiment. Also, the configuration of the antenna array 11A according to the fourth embodiment may be used in the second and third embodiments.

<Variations>

In the radar devices of the first to fourth embodiments, as explained above, the phases of envelopes of reference paths are monitored by the envelope detection unit 17, and a minimum envelope integrated distance is worked out by the integrated distance calculation unit 19. Thereby, correction is performed such that aperture synthesis does not collapse for any target.

Therefore, the correction method in the radar devices 1A to 1D of the first to fourth embodiments may be switched to the correction method that is used in the comparative example (FIG. 1) in a case where the envelope frequency is high enough to be detected using a Fourier transform (when the envelope frequency is high, the integrated distance calculation unit 19 can perform determination in a simple manner, for instance in the radar device 1A, since local maxima (or local minima) having substantially the same magnitude appear periodically over a number of times).

Other instances that require attention upon synthesis include instances where spatial phase and phase derived from a Doppler component are identical, as revealed by Expression (4.1) wherein a spatial phase term is worked into Expression (3.2). Herein, there may be switched between operation modes, in terms of, for instance, modifying a sampling frequency, performing non-uniform sampling, using a value estimated by a means such as a Kalman filter or the like, on the basis of values of various target parameters obtained at a point in time where the target to be detected has been normally detected, shifting the measurement time (or timing) by a predetermined time, or carrying out angle measuring without performing aperture synthesis.

[Expression 20]

$$\sum_{m=1}^{M} \exp[j(\omega_c \mu^m t + \phi_n^{TX1,m})] = \tag{4.1}$$

$$\frac{2}{M-1} \sum_{m=1}^{M} \sum_{l=m+1}^{M} \exp\left[j\frac{\omega_c(\mu^l + \mu^m)t + (\phi_n^{TX1,l} + \phi_n^{TX1,m})}{2}\right] \times$$

$$\cos\left[\frac{\omega_c(\mu^l - \mu^m)t + (\phi_n^{TX1,l} - \phi_n^{TX1,m})}{2}\right]$$

Alternatively, if the frequency $\omega_B$ determined by the distance delay is detected first, and $v^{TX1/2}{}_{RX/n}(t)$ is multiplied by $\exp(-j\omega_B t)$ to demodulate the component of Expression (4.1), or all $v^{TX1/2}{}_{RX/n}(t)$ are subjected to envelope detection, then the equation can be rewritten in the same form as that of Expression (1.17). Therefore, the angle estimation process can be handled as if the echo signal is made up of only the Doppler component (in terms of device configuration, this approach is an expansion of the approach of Example 4).

The signal obtained by subjecting the respective signals to envelope detection is $|HIL(v^{TX1/2}{}_{RX/n}(t))|$. It must be noted that, therefore, the angle of the target for which the angular spectrum exhibits a peak is opposite/fair in sign to the actual value (in other words, the signal obtained by subjecting the respective signals to the envelope detection is close to 100% modulation. Accordingly, angle estimation is performed on an absolute value of the signal; alternatively, aperture synthesis is realized by time diversity).

[Others]

<Hardware Constituent Elements (Components) and Software Constituent Elements (Components)>

A hardware constituent element may be a hardware circuit, for example, a field programmable gate array (FPGA), an application-specific integrated circuit (ASIC), a gate array, a combination of logic gates, a signal processor circuit or an analog circuit.

A software constituent element is a part (fragment) that realizes the above-described processes in the form of software, but is not conceptually limited in terms of, for instance, the language or development environment in which the software is realized. Examples of software constituent elements include, for instance, a task, a process, a thread, a driver, firmware, a database, a table, a function, a procedure, a subroutine, a given segment of a program code, a data structure, an array, a variable, and a parameter. Those constituent elements of software are realized, in a computer, on one or a plurality of memories, or are realized through execution of data on one or a plurality of memories by one or a plurality of processors (for example, central processing unit (CPU) or digital signal processor (DSP)).

The way in which the various abovementioned processing units are realized is not limited in the embodiments described above. The processing units may be configured in a manner that is realizable, by a person skilled in the art in technical field in question, in the form of the hardware constituent elements or software constituent elements described above, or in the form of a combination thereof.

The first through fourth embodiments can encompass the below-described aspects.

<<Aspect 1>>

A device and method such that, in a device, in particular a detection and ranging apparatus A in which there are used a transmission sensor array made up of U sensor elements and a reception sensor array made up of N sensor elements (the transmission sensors and the reception sensors may be shared, likewise hereafter); echo signals (hereafter, reception signals) generated through reflection, on a target to be detected, of probe signals radiated by the transmission sensors, are measured by each reception sensor; and a target angle is estimated on the basis of a signal synthesized through aperture synthesis performed using phases of reference paths made up of a combination of transmission/reception sensors for which spatial phases become identical:

the reception signals obtained in the respective reference paths are subjected to envelope analysis; there is worked out an integrated distance thereof; there is worked out a phase correction amount between reference paths from a delay amount that yields a minimum distance value; phases of all the reception signals including the envelopes are aligned using the correction amount; and there is realized an aperture synthesis function regardless of the situation of the target.

<<Aspect 2>>

A device and method in the detection and ranging apparatus A of aspect 1, wherein probe signals are radiated every $Q_u T_f$ times ($Q_u \in Z$, u=1 to U), from a u-th transmission sensor, for a period: $T_f$ of a modulation input signal, to a RF-VCO, for instance in a FMCW device; the N reception sensors receive signals of a time corresponding to the transmission time, and envelope analysis is performed on signals of each reference path; an integrated distance of the envelopes of reference paths is worked out after conforming, if necessary, data lengths of all reception signals, through zero padding of a shortfall in a reception signal that is less than max ($Q_u T_f$); there are aligned the phases of all reception signals including the envelopes, through counting from a delay amount that yields a minimum distance value, and clipping of a signal for min ($Q_u T_f$) time; and there is realized an aperture synthesis function regardless of the situation of the target (in particular, $T_f$ may be used as min($Q_u T_f$)).

As a result of working out the integrated distance according to the delay amount, an instance may arise wherein a local minimum appears, at a plurality of sites, very near a minimum value; in this case, however, a local minimum corresponding to a smallest delay amount is used as a signal-clipping reference point. In practice, the minimum value is of the order of noise level. Therefore, the noise level at a time of no signal is held in a memory or the like, and this value is used as a threshold value upon determination of a minimum value.

If phase synthesis fails to be established for an initial delay amount, a conceivable cause that hampers synthesis may be, for instance, a change in the travel environment, such as a sudden change in the number of targets. Therefore, the next smaller delay amount may be used as a reference position for signal clipping, or using an infrastructure-based travel-environment information providing device; the device parameters (time slot length $Q_u$, modulation input signal period $T_f$ and so forth) may be then adjusted, after which aperture synthesis is performed again. Alternatively, a scheme where angular resolution is coarse, for instance DBF or the like, may be used without performing aperture synthesis.

<<Aspect 3>>

A device and method according to Aspects 1 and 2, wherein in the detection and ranging apparatus A of aspect 1, the reception signals obtained in the respective reference paths are subjected to envelope analysis; there is worked out a difference between the sum of autocorrelations of envelopes of the reference paths and the sum of cross-correlations between envelopes between reference paths; a phase correction amount between reference paths is worked out on the basis of a delay amount for which this difference is minimal; phases of all the reception signals including the envelopes are aligned using the correction amount; and there is realized an aperture synthesis function regardless of the situation of the target.

The autocorrelation of reference paths is but the incoming signal power in the reception sensors that make up that path. Instead of working the autocorrelation out, therefore, there may be provided a circuit-based means such as a square-law detector or the like (if necessary, depending on the way in which the integrated distance is defined, accessory operations such as an averaging operation or the like may be realized using appropriate hardware/software, in accordance with the implementation conditions).

<<Aspect 4>>

The device and method according to Aspects 1 to 3, wherein, in the detection and ranging apparatus A of aspect 1, a frequency component of reception signals in the reference paths is analyzed by a second frequency analysis unit that is provided in a reference path corresponding to one appropriate transmission sensor: u0; on the basis of the results of this frequency analysis, the second frequency analysis unit controls a central frequency of central frequency-variable BPFs (Band Pass Filters) that are provided in the N reception sensors; the reception signals obtained in the respective band-split reference paths are subjected to envelope analysis; there is worked out an integrated distance therebetween; there is worked out a phase correction amount between reference paths, for each band, from a delay amount that yields a minimum distance value; phases of all the reception signals, within the band, including the envelopes, are aligned using the correction amount; and there is realized an aperture synthesis function regardless of the situation of the target.

In a case where the processing system of the BPFs comprised in the device is one for each of the N sensors, the delay amount is worked out and the aperture synthesis operation is repeated split band by split band. Accordingly, the combination of frequency analysis unit and central frequency-variable BPFs may be replaced by a filter bank.

<<Aspect 5>>

The device and method according to Aspects 1 to 3, wherein in the detection and ranging apparatus A of aspect 1, a frequency component of reception signals in the reference paths is analyzed by a second frequency analysis unit that is provided in a reference path corresponding to one appropriate transmission sensor: u0; if the result of the frequency analysis includes a frequency component equal to or smaller than the minimum resolution of the first frequency analysis unit used in a signal processing means for working out distance/velocity based on a baseband signal, then the second frequency analysis unit makes send signals of each reference path, via LPFs (Low Pass Filter) provided in a respective reference path, to an envelope detector that is provided after the LPFs; there is worked out a integrated distance between signals outputted by the envelope detectors; there is worked out a phase correction amount between reference paths from a delay amount that yields a minimum distance value; phases of all the reception signal including the envelopes are aligned using the correction amount; and there is realized an aperture synthesis function regardless of the situation of the target.

In a case where a cutoff frequency of the LPFs is a frequency equal to or smaller than the minimum resolution of the first frequency analysis unit, and the second frequency analysis unit does not detect a signal component equal to or smaller than the minimum resolution of the first frequency analysis unit, then the second frequency analysis unit makes send signals of each reference path, without modification, to the envelope detector, and not byway of the LPFs. That is, the second frequency analysis unit controls thus a signal route switching operation.

<<Aspect 6>>

The device and method according to Aspects 1 to 3, wherein there is predicted a measurement time (proportional to a reciprocal of the minimum frequency included in a envelope), until acquisition of the data necessary for performing aperture synthesis, through exchange of information that relates to, for instance, the travel velocity of each target, using the infrastructure, for instance inter-vehicle communication, on-road repeaters, a control center or the like, to improve the response speed by establishing required time slot lengths.

The device and method according to Aspects 4 to 5, wherein an estimated value of the measurement time as acquired by the various means described above is used as a reference value upon execution of filter control by the second frequency analysis unit, to improve the response speed thereby.

<<Aspect 7>>

The device and method according to Aspects 1 to 6, wherein the reception signals obtained in the respective reference paths are subjected to envelope analysis; a basic period: $T_f$ of the modulation scheme of the device or a probe signal transmission time: $Q_u T_f$ from each transmission sensor is modified in a case where a valid and unambiguous minimum value (roughly a noise power level at a time of no-signal in the installed system) is not obtained even by working out the integrated distance for aligning the phases.

The distance resolution and so forth of the device does not impair other performance items, and hence the occupied bandwidth $\Delta\omega$ of the device may be modified in concert with $T_f$. If aperture synthesis cannot be realized even by way of such measures, it may be attempted to use just some of the U transmission sensors.

<<Aspect 8>>

The detection and ranging apparatus according to Aspects 1 to 7, comprising a reception sensor that constitutes a reference path; wherein reception signals by all the reception sensor are subjected to envelope analysis; and there is used an angle estimation algorithm on the envelope signals themselves of the reception sensors as obtained after aperture synthesis.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radar device detecting a target, comprising:
   two or more transmitting antennas and two or more receiving antennas, including a combination of two or more transmitting antennas and receiving antennas that form two or more reference paths at which spatial phases become identical;
   an envelope detection unit to acquire an envelope of a reception signal received by the receiving antenna in each of the reference paths;
   a determination unit to determine a phase correction amount between the reference paths from a delay amount that yields a minimum value of an integrated distance between envelopes of the reception signals of the reference paths; and
   a correction unit to align phases of all reception signals received by the two or more receiving antennas, using the phase correction amount.

2. The radar device according to claim 1, further comprising a control unit to sequentially switch signal radiation by each of the transmitting antennas, at each transmission cycle time corresponding to a period of a reference signal for a predetermined modulation scheme,
   wherein the envelope detection unit acquires an envelope of each reception signal, which is received by the receiving antenna in each of the reference paths, of a time corresponding to the each transmission cycle time,
   the determination unit aligns durations of respective envelopes acquired by the envelope detection unit, and works out thereafter a delay amount that yields the minimum integrated distance between the envelopes, and
   the phase correction unit performs phase correction by extracting a signal of minimum time from among the transmission cycle times, from a timing delayed by the delay amount decided by the determination unit in the reception signals from the receiving antennas.

3. The radar device according to claim 1, further comprising:
   a frequency analysis unit that performs frequency analysis of reception signals received by receiving antennas that form one or more reference paths; and
   a bandpass filter through which a reception signal at a predetermined band having a central frequency according to a frequency analysis result by the frequency analysis unit passes, from among reception signals received by the receiving antennas.

4. The radar device according to claim 1, further comprising:
   a frequency analysis unit to perform frequency analysis of reception signals received by receiving antennas that form one or more reference paths; and a low-pass filter through which a reception signal of each of the reference paths passes, in a case where the reception signal includes a frequency component that is equal to or smaller than a predetermined threshold value.

5. The radar device according to claim 1, wherein at least one from among a transmission cycle time and a period of a reference signal for a predetermined modulation scheme is modified when the determination unit does not determine the minimum value of the integrated distance.

6. A target detection method, comprising:
   acquiring an envelope of a reception signal received by a receiving antenna in each of reference paths from among two or more transmitting antennas and two or more receiving antennas, including a combination of two or more transmitting antennas and receiving antennas that form two or more reference paths at which spatial phases become identical;
   deciding a phase correction amount between the reference paths from a delay amount that yields a minimum integrated distance between envelopes of the acquired reception signals of the reference paths; and
   performing correction by aligning phases of all reception signals received by the two or more receiving antennas, using the decided phase correction amount.

* * * * *